US006993765B2

(12) United States Patent
Suzuki et al.

(10) Patent No.: US 6,993,765 B2
(45) Date of Patent: Jan. 31, 2006

(54) CONTROLLER AND OPERATING SYSTEM

(75) Inventors: Shoji Suzuki, Hitachi (JP); Kunihiko Tsunedomi, Hitachi (JP); Satoru Funaki, Hitachi (JP); Masahiko Saito, Mito (JP); Yasuyuki Kojima, Hitachi (JP); Takanori Yokoyama, Hitachi (JP); Atsushi Ito, Kashiwa (JP)

(73) Assignee: Hitachi, Ltd., Tokyo (JP)

( * ) Notice: Subject to any disclaimer, the term of this patent is extended or adjusted under 35 U.S.C. 154(b) by 663 days.

(21) Appl. No.: 10/101,570

(22) Filed: Mar. 20, 2002

(65) Prior Publication Data
US 2003/0046324 A1    Mar. 6, 2003

(30) Foreign Application Priority Data
Aug. 30, 2001   (JP)   ............... 2001-261469

(51) Int. Cl.
*G06F 9/46*    (2006.01)
(52) U.S. Cl. .................................... 718/102
(58) Field of Classification Search ............... 718/100, 718/102, 103, 106, 107, 108; 712/1, 220
See application file for complete search history.

(56) References Cited

U.S. PATENT DOCUMENTS

| | | | |
|---|---|---|---|
| 4,642,756 A * | 2/1987 | Sherrod .................... 718/103 |
| 4,888,726 A | 12/1989 | Struger et al. | |
| 5,193,189 A * | 3/1993 | Flood et al. ................ 718/103 |
| 5,487,170 A * | 1/1996 | Bass et al. .................. 710/244 |
| 5,504,894 A * | 4/1996 | Ferguson et al. ............... 707/2 |
| 5,528,513 A * | 6/1996 | Vaitzblit et al. ............ 718/103 |
| 5,636,124 A | 6/1997 | Rischar et al. | |
| 5,712,976 A * | 1/1998 | Falcon et al. ............... 725/115 |
| 6,108,683 A * | 8/2000 | Kamada et al. ............. 718/103 |
| 2003/0037091 A1 * | 2/2003 | Nishimura et al. ......... 709/103 |

FOREIGN PATENT DOCUMENTS

| | | |
|---|---|---|
| DE | 197 28 989 A1 | 1/1998 |
| EP | 1 031 924 A2 | 8/2000 |
| JP | 9-251389 | 9/1997 |
| JP | 11-191002 | 7/1999 |

OTHER PUBLICATIONS

P. Bizzarri, et al, "Planning the Execution of Task Groups in Real-Time Systems", IEEE, 1996, pp. 169-174.*
J. Kay et al, "A Fair Share Scheduler", ACM, Jan. 1988, pp. 44-54.*
"µITRON 4.0 Specifications" ITRON Division of TRON Association, Japan, edited by Hiroaki Takada, under monitor by Ken Sakamura, Copyright 1999, pp. 50-55.

* cited by examiner

*Primary Examiner*—Sue Lao
(74) *Attorney, Agent, or Firm*—McDermott Will & Emery LLP

(57) ABSTRACT

A plurality of tasks are managed by being classified into a communication task group, a control task group, and a management task group for management. An execution order of the plurality of tasks is switched by a group unit and, in accordance with a switched task group, information obtained from a LAN or information obtained from each device is processed by a CPU.

3 Claims, 32 Drawing Sheets

FIG.3

| TASK GROUP | MODE 2→MODE 0 | MODE 0→MODE 1 | MODE 1→MODE 2 |
|---|---|---|---|
| COMMUNICATION | 18 | 0 | -18 |
| CONTROL | 12 | -12 | 0 |
| MANAGEMENT | 0 | 0 | 0 |

FIG.4

| MODE 0 | MODE 1 | MODE 2 |
|---|---|---|
| 3 | 3 | 4 |

(UNIT: MILLI SEC.)

FIG.5

| TASK GROUP | NUMBER OF TASKS REGISTERED IN GROUP | REGISTERED TASK |
|---|---|---|
| COMMUNICATION | 2 | TASK 1 |
| | | TASK 2 |
| CONTROL | 2 | TASK 3 |
| | | TASK 4 |
| MANAGEMENT | 3 | TASK 5 |
| | | TASK 6 |
| | | TASK 7 |

FIG.8

LIST OF TASK INITIAL PRIORITY

| TASK | INITIAL PRIORITY |
|---|---|
| TASK 1 | 3 |
| TASK 2 | 4 |
| TASK 3 | 5 |
| TASK 4 | 8 |
| TASK 5 | 9 |
| TASK 6 | 10 |
| TASK 7 | 11 |

FIG.9

| TASK | MODE 0 | MODE 1 | MODE 2 |
|---|---|---|---|
| TASK 1 | 21 | 21 | 3 |
| TASK 2 | 22 | 22 | 4 |
| TASK 3 | 17 | 5 | 5 |
| TASK 4 | 20 | 8 | 8 |
| TASK 5 | 9 | 9 | 9 |
| TASK 6 | 10 | 10 | 10 |
| TASK 7 | 11 | 11 | 11 |

| TASK GROUP | MODE 2→MODE 0 | MODE 0→MODE 1 | MODE 1→MODE 2 |
|---|---|---|---|
| COMMUNICATION | SUSPENSION | NO CHANGE | RESUMPTION |
| CONTROL | SUSPENSION | RESUMPTION | NO CHANGE |
| MANAGEMENT | NO CHANGE | NO CHANGE | NO CHANGE |

| TASK | MODE 0 | MODE 1 | MODE 2 |
|---|---|---|---|
| TASK 1 | SUSPENSION | SUSPENSION | EXECUTION |
| TASK 2 | SUSPENSION | SUSPENSION | EXECUTION |
| TASK 3 | SUSPENSION | EXECUTION | EXECUTION |
| TASK 4 | SUSPENSION | EXECUTION | EXECUTION |
| TASK 5 | EXECUTION | EXECUTION | EXECUTION |
| TASK 6 | EXECUTION | EXECUTION | EXECUTION |
| TASK 7 | EXECUTION | EXECUTION | EXECUTION |

FIG.18

| TASK GROUP | TASK NAME | PRIORITY OF MODE 0 |
|---|---|---|
| COMMUNI-CATION | TRANSMISSION | 3 |
| | RECEIVING | 3 |
| | Telnet | 4 |
| | FTP | 4 |
| | PING | 4 |
| | Httpd | 4 |
| CONTROL | FIXED PERIODIC | 5 |
| | NORMAL | 8 |
| MANAGEMENT | MONITORING | 9 |
| | DEDICATED PORT COMMUNICATION | 10 |
| | DEDICATED PORT CONTROL | 11 |

FIG.19

| TASK GROUP | TASK NAME | PRIORITY OF MODE 0 | PRIORITY OF MODE 1 | PRIORITY OF MODE 2 |
|---|---|---|---|---|
| COMMUNI-CATION | TRANSMISSION | 21 | 21 | 3 |
| | RECEIVING | 21 | 21 | 3 |
| | Telnet | 22 | 22 | 4 |
| | FTP | 22 | 22 | 4 |
| | PING | 22 | 22 | 4 |
| | Httpd | 22 | 22 | 4 |
| CONTROL | FIXED RERIODIC | 17 | 5 | 5 |
| | NORMAL | 20 | 8 | 8 |
| MANAGEMENT | MONITORING | 9 | 9 | 9 |
| | DEDICATED PORT COMMUNICATION | 10 | 10 | 10 |
| | DEDICATED PORT CONTROL | 11 | 11 | 11 |

FIG.21

| TASK GROUP | TASK NAME | PRIORITY OF MODE 0 | PRIOROTY OF MODE 1 | PRIORITY OF MODE 2 |
|---|---|---|---|---|
| COMMUNI-CATION | TRANSMISSION | SUSPENSION | SUSPENSION | EXECUTION |
| | RECEIVING | SUSPENSION | SUSPENSION | EXECUTION |
| | Telnet | SUSPENSION | SUSPENSION | EXECUTION |
| | FTP | SUSPENSION | SUSPENSION | EXECUTION |
| | PING | SUSPENSION | SUSPENSION | EXECUTION |
| | Httpd | SUSPENSION | SUSPENSION | EXECUTION |
| CONTROL | FIXED PERIODIC | SUSPENSION | EXECUTION | EXECUTION |
| | NORMAL | SUSPENSION | EXECUTION | EXECUTION |
| MANAGEMENT | MONITORING | EXECUTION | EXECUTION | EXECUTION |
| | DEDICATED PORT COMMUNICATION | EXECUTION | EXECUTION | EXECUTION |
| | DEDICATED PORT CONTROL | EXECUTION | EXECUTION | EXECUTION |

| PATTERN | MODE 0 | MODE 1 | MODE 2 |
|---|---|---|---|
| PATTERN 0 | 3 | 3 | 4 |
| PATTERN 1 | 2 | 2 | 6 |

(UNIT: MILLI SEC.)

FIG.27

| PATTERN | NUMBER OF MODES | MODE 0 | MODE 1 | MODE 2 | MODE 3 |
|---|---|---|---|---|---|
| PATTERN 0 | 3 | 3 | 3 | 4 | - |
| PATTERN 1 | 4 | 3 | 2 | 1 | 4 |

(UNIT: MILLI SEC.)

FIG.28

| TASK GROUP | MODE 2→MODE 0 | MODE 0→MODE 1 | MODE 1→MODE 2 |
|---|---|---|---|
| COMMUNICATION | 18 | 0 | -18 |
| CONTROL | 12 | -12 | 0 |
| MANAGEMENT | 0 | 0 | 0 |

FIG.29

| TASK GROUP | MODE 3→MODE 0 | MODE 0→MODE 1 | MODE 1→MODE 2 | MODE 2→MODE 3 |
|---|---|---|---|---|
| COMMUNICATION | 18 | 0 | -15 | -3 |
| CONTROL | 12 | -12 | 0 | 0 |
| MANAGEMENT | 0 | 0 | 0 | 0 |

FIG.30

| TASK GROUP | TASK NAME | PRIORITY OF MODE 0 | PRIOROTY OF MODE 1 | PRIORITY OF MODE 2 | PRIORITY OF MODE 3 |
|---|---|---|---|---|---|
| COMMUNICATION | TRANSMISSION | 21 | 21 | 6 | 3 |
| | RECEIVING | 21 | 21 | 6 | 3 |
| | Telnet | 22 | 22 | 7 | 4 |
| | FTP | 22 | 22 | 7 | 4 |
| | PING | 22 | 22 | 7 | 4 |
| | Httpd | 22 | 22 | 7 | 4 |
| CONTROL | FIXED PERIODIC | 17 | 5 | 5 | 5 |
| | NORMAL | 20 | 8 | 8 | 8 |
| MANAGEMENT | MONITORING | 9 | 9 | 9 | 9 |
| | DEDICATED PORT COMMUNICATION | 10 | 10 | 10 | 10 |
| | DEDICATED PORT CONTROL | 11 | 11 | 11 | 11 |

| MODE 2→MODE 0 | MODE 0→MODE 1 | MODE 1→MODE 2 |
|---|---|---|
| INTERRUPTION MASK | NO CHANGE | INTERRUPTION UNMASKING | ism represented by Ethernet or TCP/IP general in the world of Internet or WWW requires a guarantee of stable throughput, in which especially in reception of communication packets, packets irregularly sent in from an external device can be prevented from being left uncaptured.
CONTROLLER AND OPERATING SYSTEM

BACKGROUND OF THE INVENTION

The present invention relates to a programmable logic controller (PLC) for monitoring and controlling a device and a robot of a production line in industrial application, or a controller for monitoring and controlling various devices including an air conditioner, a security equipment, an illuminator, an elevator and the like installed in a building or at home, or devices including power, gas and water supply systems and the like for supporting an infrastructure. More particularly, the invention relates to a network controller connected to a network to perform communications with an external device, which necessitates both network communication processing and real-time control processing.

Controllers equipped with network communication functions are installed in various types of equipments and devices, and adapted to perform communications between a host and a terminal or a controller, alternatively between the controllers. At present, generally, priority assignment is first carried out in a fixed manner among operations (tasks) including control processing, network communication processing and the like, and then these tasks are executed and managed by using priority scheduling of a real-time OS. As an example of priority scheduling of the real-time OS available in the conventional art, "μITRON 4.0 Specifications" Chap. 3.2 (ITRON Division of TRON Association, edited by Hiroaki Takada under monitoring of Ken Sakamura) can be cited.

A technology is also described in JP-A-11-191002 (1999), which guarantees real-time execution of an important task by dynamically changing priority of tasks for controlling a device according to an operating state of the device, to which a controller is connected.

Reductions in size and cost of a controller are significant challenges. To meet the challenges, both control processing and network communication processing must be performed in coexistence on one microprocessor. Generally, the control processing executed on the controller requires a real-time operation, in which the processing must be completed within a predetermined time. On the other hand, the network communication processing of an information system represented by Ethernet or TCP/IP general in the world of Internet or WWW requires a guarantee of stable throughput, in which especially in reception of communication packets, packets irregularly sent in from an external device can be prevented from being left uncaptured.

In the priority scheduling of the conventional art for assigning priority in a fixed manner, various tasks are carried out by the following method.

(1) Low priority is assigned to the control processing, while high priority is assigned to the network communication processing. In this case, throughput is easily guaranteed, because execution on the controller is started from the network communication processing high in priority. On the other hand, the control processing is executed on the controller only in a state where the network communication processing high in priority is not actuated, i.e., there are no packets to be transferred. Thus, it is impossible to predict how long processor time is assigned, making it difficult to guarantee real-time execution.

(2) High priority is assigned to the control processing, while low priority is assigned to the network communication processing. In this case, it is possible to guarantee real-time execution of the control processing, because execution on the controller is started from the control processing high in priority. On the other hand, the network communication processing is executed on the controller only in a state where the control processing high in priority is not actuated at all. Thus, it is difficult to guarantee predetermined throughput.

(3) Equal levels of priority are assigned to the control processing and the network communication network. In this case, executable tasks are carried out on the controller according to an order of a queue. Thus, it is difficult to guarantee both real-time execution of the control processing, and throughput of the network communication processing.

In any case, in the fixed priority scheduling, it is possible to achieve at least one selected from the real-time execution of the control processing and the throughput of the network communication processing. However, it is difficult to achieve both.

On the other hand, the technology described in JP-A-11-191002 (1999) employs a configuration, where priority of tasks for controlling the device according to the operating state of the device, to which the controller is connected, is dynamically changed, different from the fixed priority scheduling. By changing the priority of the tasks, it is possible to guarantee real-time execution of, especially a task having highest priority assigned, or time for assigning the task to the processor. In this case, however, the real-time execution can be guaranteed only for the task of the highest priority. It is still difficult to guarantee both of the tasks of the control processing and the network communication processing.

SUMMARY OF THE INVENTION

Therefore, objects of the present invention are to provide a controller capable of guaranteeing both real-time execution of control processing and throughput of network communication processing by one information processing means, and an operating system.

In order to achieve the above-described object, in accordance with the invention, there is provided a controller, which is provided with a plurality of tasks, and a program including an operating system for controlling the execution of the tasks, wherein the plurality of tasks are managed by being classified into a communication task group for performing communications with a network communication system and a control task group for monitorially controlling a target to be monitorially controlled; an execution order of the plurality of tasks are switched by a group unit; and in accordance with the switched task group, information obtained from the target to be monitorially controlled or the network communication system is processed.

Specifically, a controller of the present invention comprises a memory for storing a plurality of tasks and a program including an operating system for controlling the execution of the tasks; an I/O interface for transferring information with a target to be monitorially controlled; a network control circuit for transferring information with a network communication system; a microprocessor for processing either of the information in accordance with the program stored in the memory; and task switching means for managing the plurality of tasks stored in the memory by classifying them into a communication task group for performing network communications and a control task group for monitorially controlling the target to be monitorially controlled, and for switching an execution order of the plurality of tasks by a group unit.

In the controller thus constructed, the task switching means can have a function of managing the plurality of tasks by classifying them into the communication task group, the control task group, and a management task group for management including the internal monitoring of the microprocessor, and a function of switching the execution order of the plurality of tasks by a group unit.

For constructing the controller, the following features can be added.

(1) The task switching means switches the execution order of the plurality of tasks by the group unit in accordance with priority in response to a switching command.

(2) The task switching means uniformly changes priority of all the tasks in the group when switching the execution order of the plurality of tasks by the group unit in accordance with the priority.

(3) The task switching means switches the execution order of the plurality of tasks by the group unit in response to a switching command, and uniformly suspends/resumes execution of all the tasks in a group for which execution of the tasks is to be suspended/resumed.

(4) The task switching means switches the execution order of the plurality of tasks by the group unit in accordance with an execution mode for giving priority to communications with the network communication system over control of the target to be monitorially controlled, or an execution mode for giving priority to the control of the target to be monitorially controlled over the communications with the network communication system.

(5) The task switching means manages operation patterns including the execution mode giving priority to the communications and the execution mode giving priority to the control by classifying them into a plurality of operation patterns, switches the plurality of operation patterns in response to an operation pattern switching command, manages execution time of each execution mode for the switched operation pattern, and instructs switching to the other execution mode after a passage of each execution time.

(6) The task switching means switches the execution order of the plurality of tasks by the group unit in accordance with an execution mode giving priority to communications with the network communication system over control of the target to be monitorially controlled, an execution mode giving priority to the control of the target to be monitorially controlled over the communications with the network communication system, or an execution mode giving priority to management over each of the above modes.

(7) The task switching means manages execution time of each execution mode, and instructs switching to the other execution mode after a passage of each execution time.

(8) The task switching means manages operation patterns including the execution mode giving priority to the communications, the execution mode giving priority to the control, and the execution mode giving priority to the management over each of the above execution modes by classifying them into a plurality of operation patterns, switches the plurality of operation patterns in response to an operation pattern switching command, manages execution time of each execution mode for the switched operation pattern, and instructs switching to the other execution mode after a passage of each execution time.

(9) Received information monitoring means is provided to monitor a quantity of received information obtained from communications with the network communication system. The received information monitoring means instructs the task switching means to switch to an operation pattern in accordance with the quantity of received information.

In accordance with the invention, there is provided a controller, comprising the following elements as software: a plurality of tasks for performing communications and control; and task switching means for managing the plurality of tasks by classifying them into a communication task group for communicating with a network communication system, and a control task group for monitorially controlling a target to be monitorially controlled, and switching an execution order of the plurality of tasks by a group unit.

In the controller thus constructed, as the plurality of tasks, ones for communications, control and management can be used ands, as the task switching means, one having a function of managing the plurality of tasks by classifying them into a communication task group, a control task group, and a management task group for management, and switching an execution order of the plurality of tasks by a group unit can be used.

In accordance with the invention, there is provided an operating system, comprising a system call for managing a plurality of tasks by classifying them into a plurality of groups and by a group unit, and switching an execution order of the plurality of tasks by the group unit.

For constructing the operating system, the following features can be added.

(1) The system call switches the execution order of the plurality of tasks by the group unit in accordance with priority in response to a switching command, and uniformly changes priority of all the tasks in the group.

In accordance with the invention, there is provided a remote monitorial control system, comprising one of the above-described controllers, and an information terminal connected to the above-described network communication system.

Moreover, in accordance with the invention, there is provided a distributed control system, comprising a plurality of any of the above-described controllers. In this case, the controllers are disposed in a distributed manner.

According the above-described means, when control information obtained from the target to be monitorially controlled or communication information obtained from the network communication system is processed, the plurality of tasks are managed by the group unit, and the execution order of the plurality of tasks is switched by the group unit. Thus, it is possible to surely guarantee information processing of each group.

Furthermore, when the execution order of the plurality of tasks is switched by the group unit, by changing the execution order of each group in accordance with priority or by suspending/resuming execution, it is possible to guarantee minimum execution time for control processing and communication processing. Thus, real-time execution of the control processing can be guaranteed by designing for completion of processing within a predetermined time (within a time for preferentially executing the control processing). For the communication processing, its throughput can be easily guaranteed by increasing receive information monitoring means (communication buffer).

Other objects, features and advantages of the invention will become apparent from the following description of the embodiments of the invention taken in conjunction with the accompanying drawings.

BRIEF DESCRIPTION OF THE DRAWINGS

FIG. 3 is an explanatory view showing priority deviation of a task group during execution mode switching.

FIG. 4 is an explanatory view showing mode duration value set in an execution counter.

FIG. 5 is a structure view showing a first embodiment of task group information.

FIG. 8 is an explanatory view showing initial priority of tasks.

FIG. 9 is an explanatory view showing priority of the tasks on each execution mode.

FIG. 18 is an explanatory view showing initial priority of tasks.

FIG. 19 is an explanatory view showing priority of tasks on each execution mode.

FIG. 21 is an explanatory view showing a task execution state on each execution mode.

FIG. 27 is an explanatory view showing the number of modes on each pattern, and a mode duration value set in each execution counter.

FIG. 28 is an explanatory view showing priority deviation of a task group during execution mode switching on a pattern 0.

FIG. 29 is an explanatory view showing priority deviation of a task group during execution mode switching on a pattern 1.

FIG. 30 is an explanatory view showing priority of the tasks on the pattern 1.

DESCRIPTION OF THE EMBODIMENTS

Figure 1:
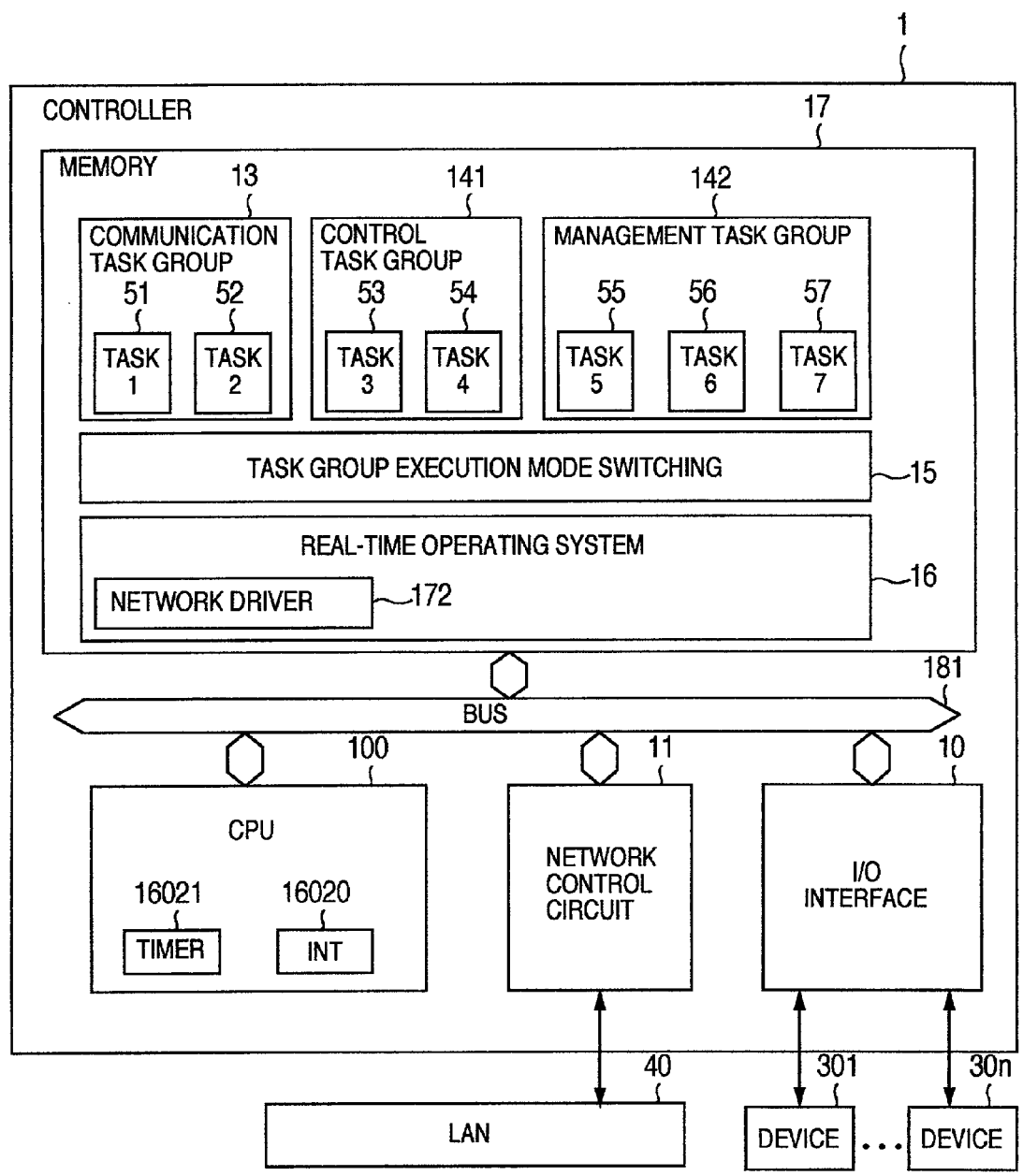
FIG. 1 is a block diagram showing a basic configuration of a controller according to the invention.

Next, description will be made of an embodiment of the present invention with reference to the accompanying drawings. FIG. 1 is a block diagram showing a basic configuration of a controller. In FIG. 1, the controller 1 comprises a memory 17, a CPU 100, a network control circuit 11, an I/O interface 10, and a bus 181. The memory 17, the network control circuit 11, and the I/O interface 10 are interconnected through the bus 181. The network control circuit 11 is connected to a LAN 40 constituting a network communication system, and adapted to transfer communication information with the LAN 40. The I/O interface 10 is connected to devices 301, . . . , 30n (n is an integer) as targets to be monitorially controlled, and adapted to transfer information regarding control information with each device. The CPU 100 includes a timer 16021, and an interruption control circuit (INT) 16020, which constitute an information processing system. The CPU 100 is provided as information processing means for processing information obtained from the LAN 40, and information obtained from each of the devices 301 to 30n.

On the other hand, the memory 17 includes a communication task group 13, a control task group 141, a management task group 142, task group execution mode switching 15, and a real-time operating system 16. The communication task group 13 includes two communication tasks 51 and 52; the control task group 141 two control tasks 53 and 54; and the management task group 142 three control tasks 55, 56 and 57. The real-time operating system 16 includes a network driver 172. The task group execution mode switching 15 is provided as task switching means for managing a plurality of tasks by classifying them into the communication task group 13 for communicating with the LAN 40, the control task group 141 for monitorially controlling the devices 301 to 30n, and the management task group 142 for management including internal monitoring of the CPU 100, and switching an execution order of the plurality of tasks.

On the memory 17, programs executed by the CPU 100, and a region for storing data necessary for execution of the programs are present. The programs executed by the CPU 100 are those for the communication task group 13, the control task group 141, the management task group 142, the task group execution mode switching 15, and the real-time operating system 16.

According to the invention, an object is to execute both control processing and network communication processing in coexistence on one microprocessor and, basically, the number of microprocessors (CPU) on the controller is one.

For the network control circuit 11, a network of an information system, such as Ethernet, HomePNA, IEEE1394, IEEE802.11, or HomePLUG. Needless to say, however, the invention can be applied to networks other than those of the information system, e.g., a field network such as Profibus or ControlNet, or a network of a control system such as ARCNET. In addition, the LAN 40 includes a LAN cable (a private line, a telephone line, an electric lamp line or the like) defined by the above-described network, or radio.

A basic operation of the controller 1 is as follows. The CPU 100 executes the tasks from one in an executable state and high in priority in order by a task scheduling function of the real-time operating system 16. If a task to be executed belongs to the communication task group, when information of this task is transferred through the network driver 172 to the CPU 100, the CPU 100 reads data received by the network control circuit 11 from the LAN 40, then executes corresponding communication processing, or sends transmission data to the network control circuit 11, and sends the transmission data from the network control circuit 11 to the LAN 40. On the other hand, if a task to be executed belongs to the control task group, when information of this task is transferred through the I/O interface 11 to the CPU 100, the CPU 100 receives data from the external devices 301 to 30n, executes corresponding control processing, and then monitorially controls the devices by outputting a result of the execution through the I/O interface 11 to the external devices 301 to 30n. If a task to be executed belongs to the management task group, when information of this task is transferred to the CPU 100, the CPU 100 monitors the inside of the controller, obtains log information or executes dedicated port communication processing for debugging.

For the above-described task groups, priority of tasks in the task group is changed in block by the task group execution mode switching 15 periodically actuated by the timer 16021 based on an interruption (switching command) 16020, the tasks in the group are suspended (Suspend) in block, or processing is resumed (Resume). In this way, execution of the tasks is controlled by a group unit. Accordingly, for each mode switching, tasks to be executed, or an execution order of tasks is varied.

(Task Group Execution Mode Switching)

FIG. 1 shows a basic configuration of the invention including a first embodiment of the task group execution mode switching 15. In the drawing, component other than internal components of the task group execution mode switching 15 are similar to those of FIG. 1.

The task group execution mode switching 15 includes an execution mode 151, an execution counter 152, task group priority changing 53, and task group information 154.

The task execution mode switching 15 includes interruption processing or a task. In the latter case, the task execution mode switching 15 is switched following execution of the task, and priority of the task execution mode switching 15 is set highest, or at least higher than priority of any tasks constituting the task group as a target to be monitorially controlled.

In the execution mode 151, a change in priority of the task group generates several patterns in higher and lower relation of priority among the tasks. The patterns of such higher and lower relation are managed by the execution mode 151. FIG. 3 shows an example of management by the execution mode, where deviation of priority among the tasks during mode switching is shown. Here, as an example, assuming that there are three types of execution modes, i.e., a mode 0, a mode 1, and a mode 2, and the modes are cyclically switched as follows:

Mode 0→mode 1→mode 2→mode 0→. . .

In addition, during mode switching shown below, priority of deviation is added to all the tasks in each task group.
(1) During switching of mode 2→mode 0,
 18 is added to priority of all the tasks in the communication task group,
 12 is added to priority of all the tasks in the control task group, and
 no changes are made in priority of all the tasks in the management task group.
 (2) During switching of mode 0→mode 1,
no changes are made in priority of all the tasks in the communication task group,
 −12 is added (12 is subtracted) to priority of all the tasks in the control task group, and
 no changes are made in priority of all the tasks in the management task group.
(3) During switching of mode 1→mode 2,
 −18 is added (18 is subtracted) to priority of all the tasks in the communication task group,
 no changes are made in priority of all the tasks in the control task group, and
 no changes are made in priority of all the tasks in the management task group.

Duration of each mode is set in the execution counter 152. The timer 1602 of FIG. 1 measures time, and actuates the task execution mode switching 15 by generation of interruption (switching command) after passage of the set duration. FIG. 4 shows set values of mode duration in the execution counter, in a case where the above-described three modes are present. Here, as an example, the mode 0 is set to 3 milli-sec.; the mode 1 to 3 milli-sec.; and the mode 2 to 4 milli-sec.; and one cycle to 10 milli-sec.

The task group information 154 is used for managing registered tasks of each task group. As shown in FIG. 5, the task group information 154 may be formed by using a structure or an array. In FIG. 5, for each task group, the number of tasks registered in the task group, information of each registered task (task ID, or a pointer to the task control table managed by the real-time operating system 16 for task scheduling, are registered.

Figure 6:
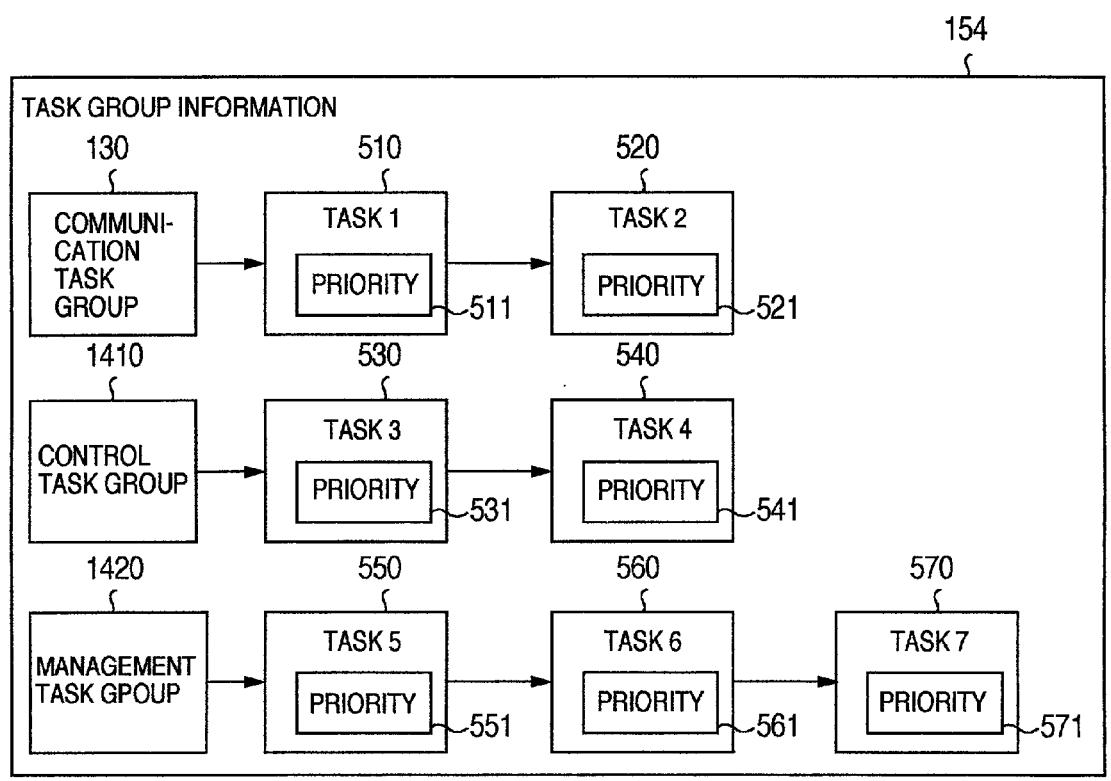
FIG. 6 is a structure view showing a second embodiment of task group information.

As another structure of the task group information 154, as shown in FIG. 6, a method of constructing it in a list by using pointers to connect the task control table. In FIG. 6, the task group information includes a communication task group 130, a control task group 1410, and a management task group 1420. The communication task group 130 is connected through the pointers to task control tables 510 and 520; the control task group 410 through the pointers to task control tables 530 and 540; and the control task group 420 through the pointers to task control tables 550, 560 and 570.

The task control tables 510 to 570 respectively have task priority information 511, 521, 531, 541, 551, 561 and 571. To construct such a list, new linkage information (a pointer to a next task control table, or a pointer to a previous task control table) must be provided in the task control table.

Figure 7:
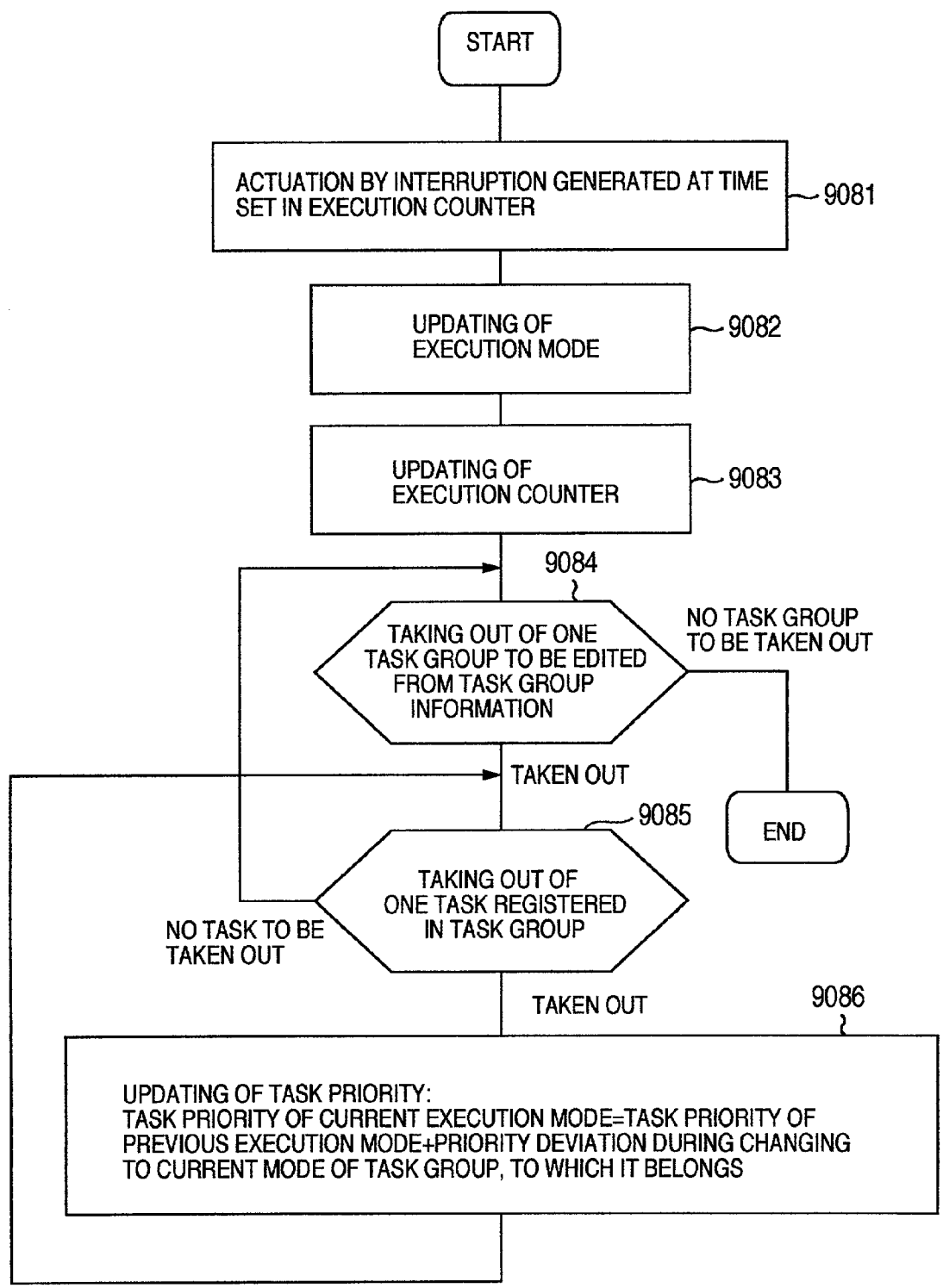
FIG. 7 is a flowchart illustrating an operation of task group executing mode switching.

Next, description is made of an operation of the task group priority changing (=operation of the task group execution mode switching 15) by referring to a flowchart of FIG. 7.

First, with a passage of the time previously set in the execution timer 152, interruption (switching command) occurs form the timer, and the task execution mode switching 15 is actuated (9081). After its actuation, the task group priority changing 153 first updates an execution mode (9082). The updating of the execution mode is achieved by calculation described below.

New execution mode number=previous execution mode (number of all (number+1) % modes) By referring to a mode duration value set in the execution counter (FIG. 4), duration of the new execution mode is set in the execution counter (9083).

Then, one task group to be edited is taken out by referring to the task group information 154 of FIG. 5. Then, for all tasks registered in the task group (9085), task priority is updated (9086). The updating is achieved by calculation below.

Priority of task of current execution mode=priority of previous execution mode+priority deviation during switching to current mode of task group to which it belongs (priority deviation of task group during mode switching (see FIG. 3))

The above-described calculation is carried out for all the tasks of all the task groups registered in the task group information of FIG. 5.

(Specific Operation Example)

Next, description is made of a specific example of an operation of the foregoing embodiment.

FIG. 8 shows initial priority of each of totally seven tasks 1 to 7 of FIG. 1. Here, a smaller value means higher priority. The task group execution mode switching 15 is operated to add priority of priority deviation of FIG. 3 to these tasks during mode switching. As a result, priority of the task on each mode becomes similar to that shown in FIG. 9.

However, for the addition of the priority of the priority deviation during mode switching to the initial priority, priority deviation during switching of last mode→first mode, i.e., mode 2→mode 0 of FIG. 3 is used. For example, in the task 1, on a mode 0, initial priority 3 is added to priority deviation 18 of mode 2→mode 0 to make 21. Priority on the mode 2 is set a value equal to that of initial priority shown in FIG. 8.

Higher and lower relations in priority among the task groups on each execution mode are as follows:

(1) Mode 0: management task group>control task group>communication task group
(2) Mode 1: control task group>management task group>communication task group
(3) Mode 2: communication task group>control task group>management task group There are no changes made in a higher and lower relation in priority among the tasks of each task group.

Figure 10:
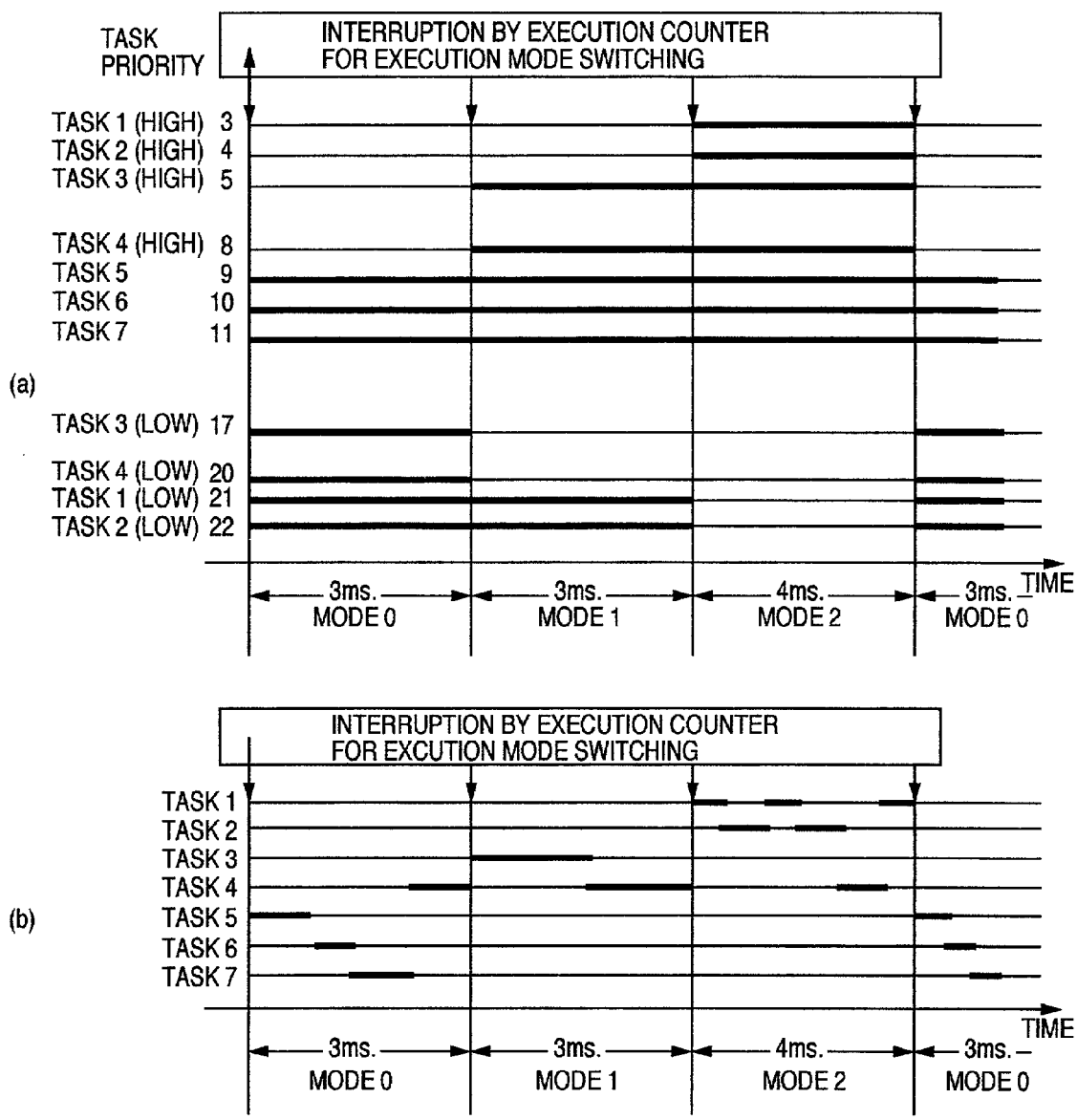
FIG. 10 is time charts each illustrating a change in priority of the tasks by execution mode switching.

FIG. 10a is a graph showing FIG. 9 by a time chart. For example, on the mode 0, since priorities of the tasks are respectively set to 9, 10, 11, 17, 20, 21 and 22, interruptions occur in the tasks 5, 6, 7, 3, 4, 1 and 2 from high in priority order.

In addition, FIG. 10b is a graph showing a time chart of an execution example of each task. As shown in the graph of FIG. 10b, in a time zone of the mode 0, the management task group is preferentially executed; on the mode 1, the control task group; and on the mode 2, the communication task group.

Therefore, in the time zone of the mode 0, since the management task group is higher in priority than the other task groups, achievement of real-time control of the management task group is facilitated. Similarly, on the mode 1, achievement of real-time control of the control task group is facilitated; and on the mode 2, achievement of real-time control of the communication task group. Especially, as certain periodicity is required of a starting timing of each task for real-time processing, compatibility with mode switching having periodicity is high. On the other hand, in communication processing, especially receiving processing, since data is sent in irregularly from the LAN 40, even if the communication processing is carried out only in the time zone of the mode 2 as in the case of the embodiment, a packet receiving buffer is increased to prevent a capturing failure of packets sent in from the LAN 40 as much as possible. Thus, at least guaranteeing of throughput of the communication processing is facilitated.

According to the embodiment, for processing control information obtained from the target to be monitorially controlled or communication information obtained from the network communication system, the plurality of tasks are managed by the group unit, and the execution order of the plurality of tasks is switched by the group unit. Thus, processing of information of each group can be surely guaranteed.

Moreover, when the execution order of the plurality of tasks is switched by the group unit, the execution order of each task is changed in accordance with priority. Thus, it is possible to guarantee minimum execution time for the control processing and the communication processing.

(Second Embodiment: Task Group Suspension/Resumption)

(Task Group Execution Mode Switching)

Next, description is made of a second embodiment of a task group execution mode switching 15.

Figures 11, 12:
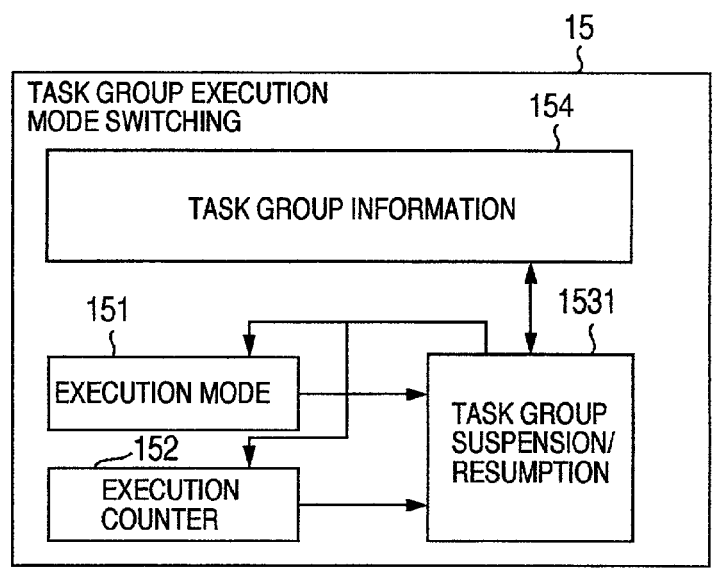
FIG. 11 is a block diagram showing a second configuration of task group mode execution switching.
FIG. 12 is an explanatory view showing a change of task group execution state during execution mode switching.

FIG. 11 shows the second embodiment of the task group execution mode switching 15.

The task group execution mode switching 15 includes an execution mode 151, an execution counter 152, a task group suspension/resumption processing 1531, and task group information 154. That is, the second embodiment is different from the first embodiment of the task group execution mode switching 15 of FIG. 2 in that the task group priority changing 153 is replaced by the task group suspension/resumption processing 1531. The other components 151, 152 and 254 are similar to those of the first embodiment.

However, a content of a mode to he managed by the execution mode 151 becomes similar to that of FIG. 12. That is, on the execution mode 151, task group execution suspension/resumption form several patterns of execution states of a task group, and these patterns are managed by the execution mode 151. FIG. 12 shows an example of management by the execution mode, specifically a change in an execution state of the task group during mode switching. Here, as in the case of the embodiment of FIG. 3, it is assumed that there are three types of execution modes, i.e., a mode 0, a mode 1 and a mode 2, and the modes are switched cyclically as follows, Mode 0→mode 1→mode 2→mode 0→...

In this case, an execution mode of each task group is changed as follows during mode switching:
(1) In switching of mode 2→mode 0,
   all tasks in a communication task group are suspended,
   all tasks in a control task group are suspended, and
   no changes are made in execution states of all tasks in management tasks.
(2) In switching of mode 0→mode 1,
   no changes are made in execution states of all the tasks in the communication task group,
   execution of all the tasks in the control task group is resumed or started, and
   no changes are made in execution states of all the tasks in the management task group.
(3) In switching of mode 1→mode 2,
   execution of all the tasks in the communication task group is resumed,
   no changes are made in execution states of all the tasks in the control task group, and
   no changes are made in execution states of all the tasks in the management task group.

Figure 13:
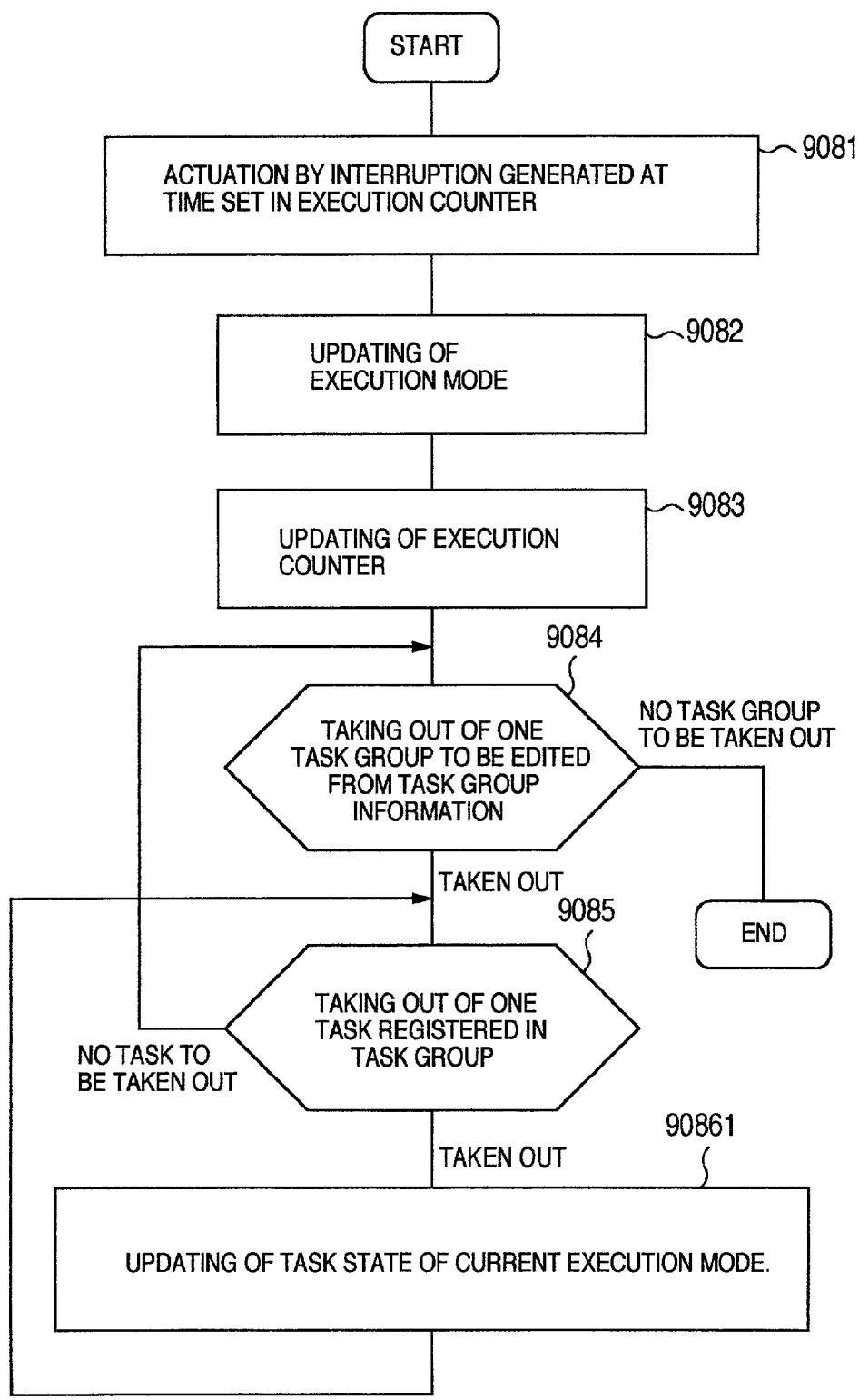
FIG. 13 is a flowchart illustrating an operation of task group execution mode switching.

Now, description is made of an operation of the task group suspension/resumption processing 1531 (=operation of task group execution mode switching 15) by referring to a flowchart of FIG. 13.

First, with a passage of time previously set in the execution counter 152, interruption (switching command) occurs from the timer, and the task execution mode switching 15 is actuated (9081). After the actuation, the task group suspension/resumption processing 1531 first updates an execution mode (9082). The updating of the execution mode is achieved by the following calculation:

New execution mode number=previous execution mode (number of all (number+1) % modes)

In addition, by referring to a mode duration value set in the execution counter (FIG. 4), duration of a new execution mode is set in the execution counter (9083).

Then, one task group to be edited is taken out by referring to the task group information 154 (9084). Further, for all the tasks registered in the task group (9085), the execution states of the tasks are updated by referring to changes in the execution states of the task group during mode switching (FIG. 12) (90861). The foregoing is carried out for all the tasks of all the tasks registered in the task group information 154.

(Specific Example)

The above-described operation is now described by way of specific example.

Figures 14, 15:
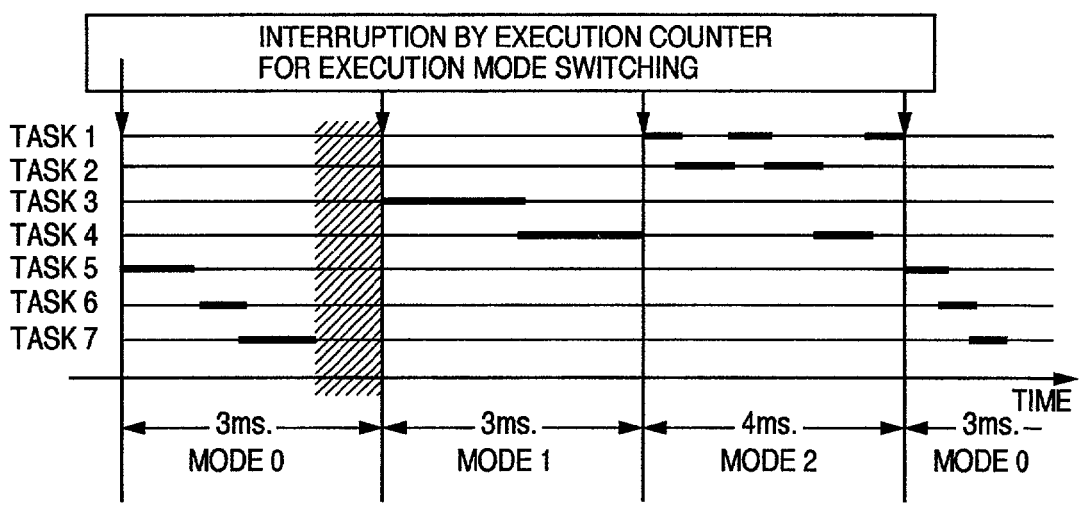
FIG. 14 is an explanatory view showing a task execution state on each execution mode.
FIG. 15 is a time chart illustrating task execution by execution mode switching.

FIG. 14 shows an execution state of a task on each mode, as a result of changes made in the execution states of the totally seven tasks 1 to 7 of FIG. 1 by the operation of the task group execution mode switching 15 during mode switching of FIG. 12. In FIG. 14, suspension means one of forcible standby states (SUSPENDED or WAITING-SUSPENDED). This is equivalent to, when a need arises to suspend a task because of mode switching, any one of the following states, in which the task has been, i.e., an execution state (RUNNING), an executable state (READY) and a standby state (WAITING). Conversely, execution means a return of a task state to one selected from RUNNING, READY and WAITING. In a dormant state of a task (DORMANT), no state changes are made irrespective of task suspension/execution.

Execution states of the task groups on respective modes are as follows:
(1) Mode 0: a communication task group and a control task group are suspended. A management task group is executed.
(2) Mode 1: the communication task group is suspended. The control task group and the management task group are executed.
(3) Mode 2: the communication task group, the control task group and the management task group are all executed.

FIG. 15 is a graph showing a time chart of an execution example of each task of FIG. 14. As shown in the graph of FIG. 15, after an occurrence of interruption during execution mode switching by the execution counter, at time of mode starting, the task group execution mode switching 15 is executed, and changes are made in execution states of the tasks. In a time zone of the mode 0, since the control task group and the communication task group are both suspended, only the management task group is executed. On the mode 1, execution of the control task group is resumed, and execution is made preferentially from the management task group. On the mode 2, execution of the communication task group is resumed, and this group is preferentially executed before the other task groups. A difference from the graph of FIG. 10b is that even if execution of all the tasks of the management task group is finished in the middle of the mode 0, no tasks are present any more to be executed, and thus there is a high possibility of idling of the CPU 100 (see a hatched line portion of FIG. 15).

An advantage of the second embodiment of the task group execution mode switching 15 is basically similar to that of the first embodiment. A difference is that since the CPU becomes idle more frequency than in the first embodiment, and processing time is shorter for the task suspension/resumption than for the changing of the priority of the tasks of the first embodiment during mode switching, overhead is smaller than that of the first embodiment during mode switching.

In the embodiment, for the communication task group, WEB communications using HTTP protocol represented by WWW, or communications of TCP/IP base standard in the network communications of an information system, such as TELNET or FTP communications, or communications using a socket are assumed. For the control task group, sequence control requiring real-time processing is assumed, which is described in a ladder language general used as a descriptive language for a programmable logic controller (PLC), an ladder diagram (LD) language internationally standardized as IEC61131—3, an instruction list (IL) language, a structured text (ST) language, a function block diagram (FBD) language, a sequential function chart (SFC), a flowchart or the like.

Figure 37:
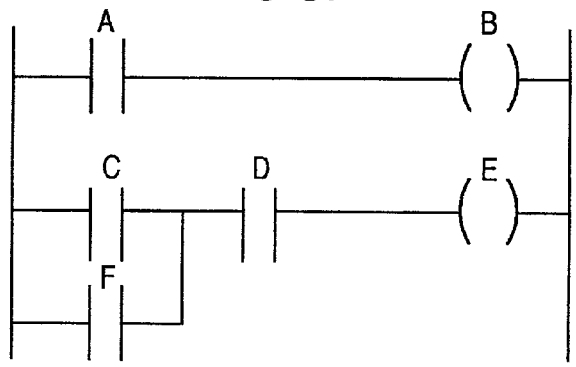
FIG. 37 is an explanatory view showing sequence control described in a ladder language.

Needless to say, however, the embodiment can be applied to information communications, and control communications other than the above, or control processing. FIG. 37 shows an example of sequence control described in the ladder language. In FIG. 37, A, C, D and F are equivalent to contacts (inputs), and B and E to contacts (outputs). These contacts take digital values of 0 or 1. In the example of a ladder circuit of FIG. 37, the following logical calculation is represented:

B=A

E=(C OR F) AND D

The number of task groups, and the number of tasks of the task group described above are just examples, and the number of task groups may be other than three. That is, needless to say, the foregoing embodiment can be applied even if the number is task groups is one, two or four or more. Similarly, the number of tasks constituting each task group can be optionally set to one or more.

The embodiment has been described by way of example, where there are three types of execution modes, and duration of the modes were respectively 3 milli-sec., 3 milli-sec., and 4 milli-sec., i.e., one cycle of 10 milli-sec. Needless to say, however, the embodiment can be applied even if the number of mode types may be two, four or more. In addition, duration of each mode can also be set optionally.

The priority value set in each task, and the value of the priority deviation during mode switching described above are also just examples, and other values can be set.

As the embodiments of the task group execution mode switching 15, two examples have been described, but it is also possible to provide another embodiment in which both of them are simultaneously performed.

In FIG. 1, the number of network control circuits is one on the controller. In the case of two or more network control circuits, each network control circuit needs a dedicated communication task group, but the embodiment can be applied.

According to the embodiment, when the control information obtained from the target to be monitorially controlled, and the communication information obtained from the network communication system are processed, the plurality of tasks are managed by the group unit, and the execution order of the plurality of tasks is switched by the group unit. Thus, it is possible to surely guarantee processing of information of each group.

Furthermore, when the execution order of the plurality of tasks, by changing the execution order of each group based on execution suspension/resumption, it is possible to guarantee minimum execution time for the control processing and the communication processing.

(Third Embodiment: Task Group Priority Control)

Figure 16:
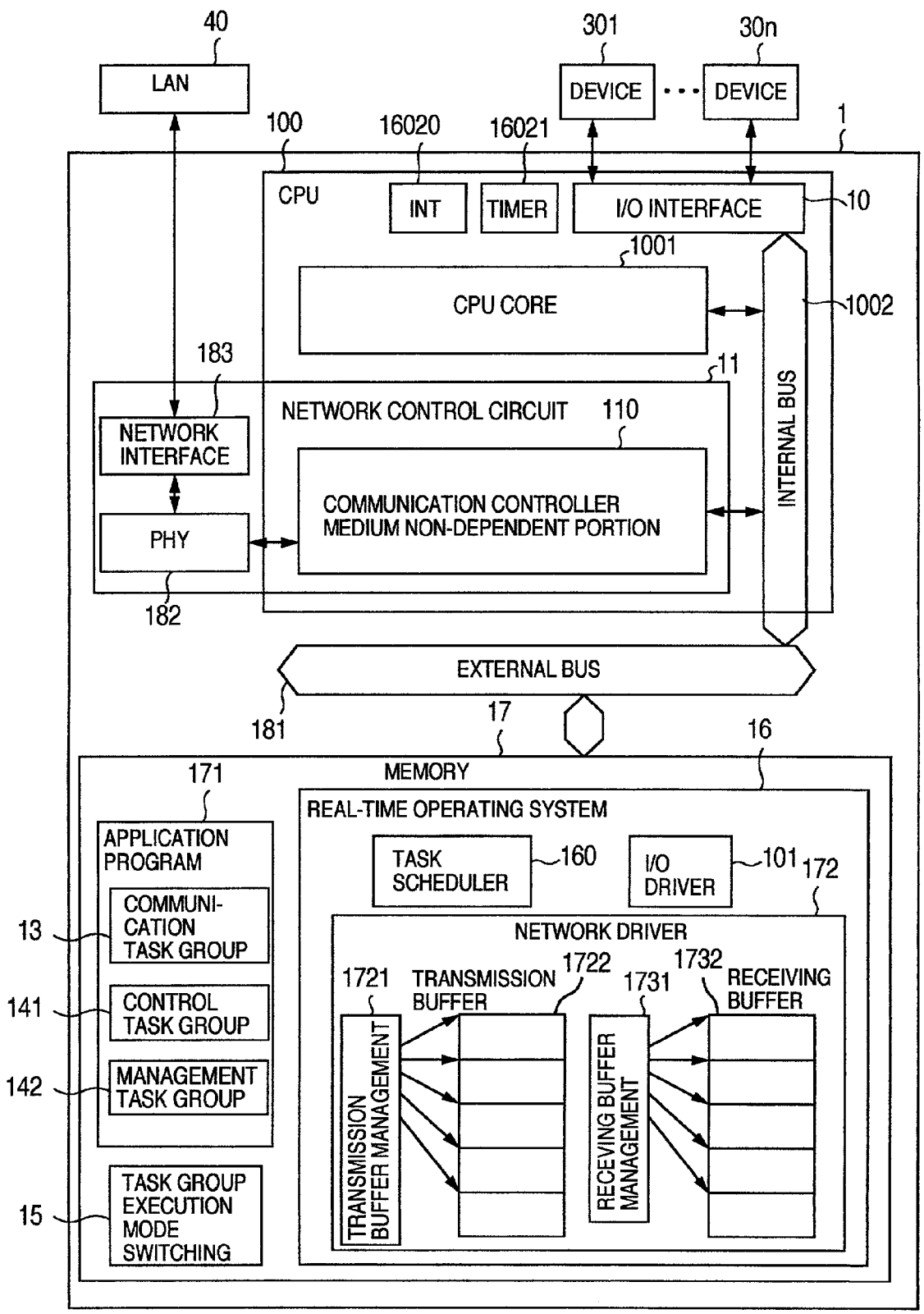
FIG. 16 is a block diagram showing a hardware configuration of the controller of the invention.

FIG. 16 shows a configuration example of a controller of the invention, focusing on a hardware configuration.

The controller 1 comprises a CPU 100, a memory 17, a PHY module 182, and a network interface 183. The memory 17, and the CPU 100 are connected to an external bus 181. The CPU 100 includes a CPU core 1001, a timer 16021, an interruption control circuit (INT in the drawing) 16020, an I/O interface 10, and a communication controller medium nondependent portion 110. the CPU core 1001, the communication controller medium non-dependent portion 110, an the I/O interface 10 are connected to an internal bus 1002.

Here, the PHY module 182 is a transceiver for achieving a network physical layer.

The communication controller medium non-dependent portion 110, the PHY module 182, and the network interface 183 constitute the network control circuit shown in FIG. 1.

The controller 1 is connected to a LAN 40 by the network interface 183, and to devices 301 to 30n (n is an integer) by the I/O interface 10, thus connected to an external device.

On the memory 17, a region is present for storing programs to be executed by the CPU 100, and data necessary for program execution. An application program 171 includes a communication task group 13, a control task group 141, and a management task group 142. On the memory 17, in addition, programs are present including task group execution mode switching 15, a real-time operating system 16, a task scheduler 160 included in the real-time operating system 16, an I/O driver 101, and a network driver 172. The network driver 172 includes transmission buffer management 1721, a transmission buffer 1722, receiving buffer management 1731, and a receiving buffer 1732. The transmission buffer management 1721, and the receiving buffer management 1731 manages inputting/outputting of data to/from the buffers 1722 and 1731 to be managed by FIFO policy.

A basic operation of the controller 1 shown in FIG. 16 is as follows. The CPU core 1001 in the CPU 100 executes tasks in order from those in executable states and the highest in priority by using the task scheduler 160 of the real-time operating system 16.

If a task to be executed belongs to the communication task group, network transmission, network receiving, or a higher-order communication application is executed for the task. In the network transmission, transmission data is registered in the transmission buffer 1722 by the transmission buffer management 1721 in the network driver 172. On the other hand, in network receiving, received data stored in the receiving buffer 1732 is taken out by the receiving buffer management 1731 in the network driver 172.

Access to the transmission buffer 1722 and the receiving buffer 1732 is also carried out by the network control circuit 11 (in FIG. 16, the communication controller medium non-dependent portion 110 to be exact). That is, the transmission data stored in the receiving buffer 1722 is taken out by referring to the transmission buffer management 1721, and data is transmitted to the LAN 40. On the other hand, the data received from the LAN 40 is registered in the receiving buffer 1732 by referring to the receiving buffer management 1731.

On the other hand, if a task to be executed belongs to the control task group, information of this task is transferred through the I/O driver to the I/O interface 11 to the CPU 100. The CPU 100 receives data entered from the external devices 301 to 30n, executes corresponding control processing, then similarly outputs a result of the control processing through the I/O driver 101 to the I/O interface 11 to the external devices 301 to 30n, thus performing monitorial control of the device.

If a task to be executed belongs to the management task group, for this task, the inside of the controller is monitored, log information is obtained, or port communication processing dedicated for debugging is carried out.

The above-described task groups are subjected to task execution control by the group unit, for example in a manner that the tasks in the task group are changed for priority en block by the task group execution mode switching 15 periodically actuated by the timer 16021 based on an interruption entry 16020, or the tasks in the task group are suspended en block (SUSPEND) or processing is resumed (RESUME). Accordingly, for each mode switching, tasks to be executed or the execution order of tasks is varied.

(Software Configuration)

Figure 17:
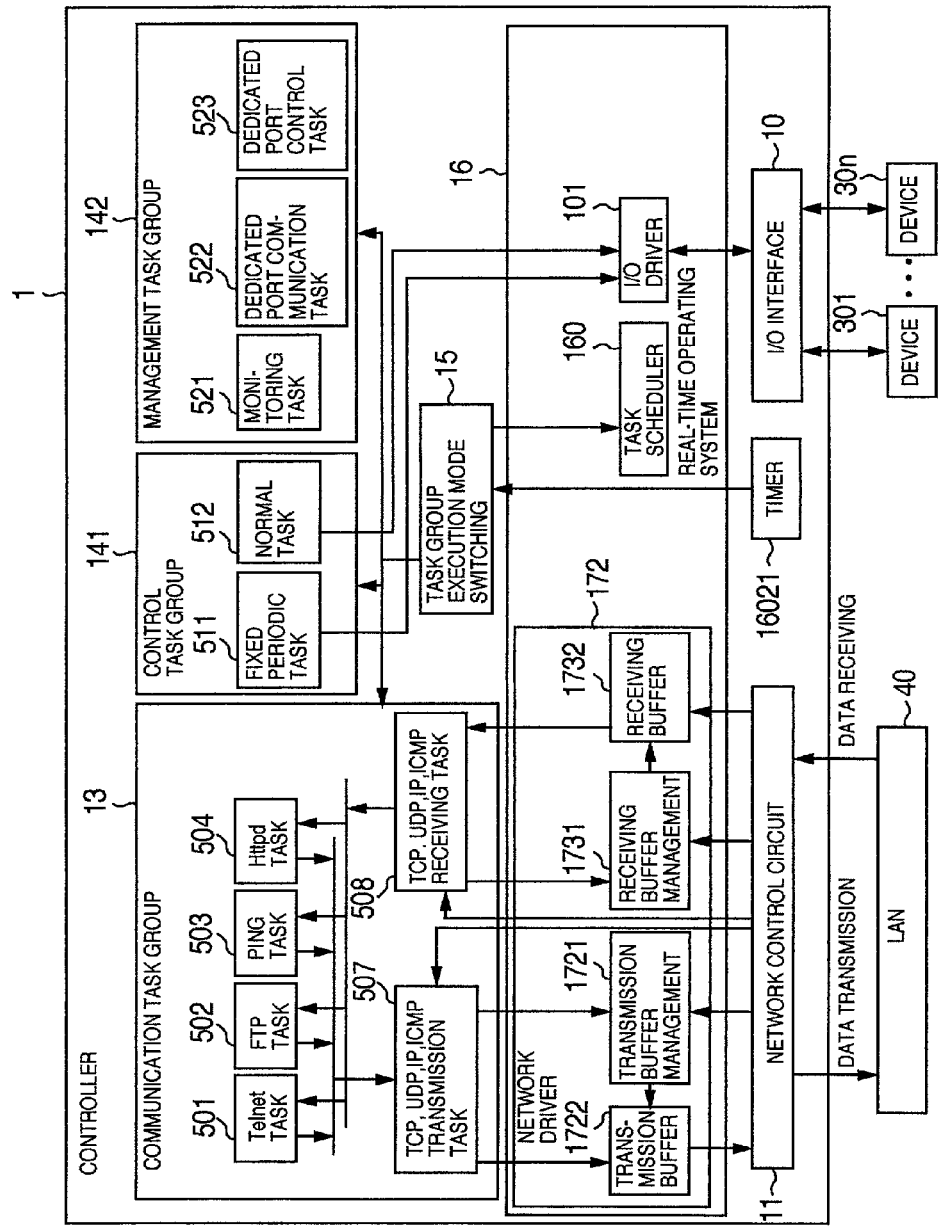
FIG. 17 is a block diagram showing a software configuration of the controller of the invention.

FIG. 17 shows a software configuration operated on the controller of FIG. 16.

As application programs to be executed by the CPU on the controller 1, there are a communication task group 13, a control task group 141, and a management task group 142. Execution of these task groups is controlled by the task group execution mode switching 15. Also, as basic software, there are an real-time operating system 16, a task scheduler 160 included in the real-time operating system 16, an I/O driver 101, and a network driver 172. The network driver 172 includes transmission buffer management 1721, a transmission buffer 1722, receiving buffer management 1731, and a receiving buffer 1732. The transmission buffer management 1721, and the receiving buffer management 1731 manage inputting/outputting of data to/from buffers 1722 and 1732 to be managed by FIFO policy.

In the communication task group 13, Telnet task 501, FTP task 502, PING task 503 and Httpd task 504 as higher-order applications tasks, TCP, UDP, IP, and ICMP transmission task 507 for network transmission, and TCP, UDP, IP and ICMP transmission task 508 for network receiving are registered. In the TCP, UDP, IP and ICMP transmission task 507, transmission data is registered in the transmission buffer 1722 by the transmission buffer management 1721 in the network driver 172. On the other hand, in the TCP, UDP, IP, and ICMP receiving task 508, transmission data stored in the receiving buffer 1732 is taken out by the receiving buffer management 1731 in the network driver 172.

Access to the transmission buffer 1722, and the receiving buffer 1732 is also carried out by the network control circuit 11. That is, the transmission data stored in the receiving buffer 1722 is taken out by referring to the transmission buffer management 1721, and data is transmitted to the LAN 40. On the other hand, the data received from the LAN 40 is registered in the receiving buffer 1732 by referring to the receiving buffer management 1731.

In the control task group 141, a normal task 512 is registered, which is operated in a manner of a background job by repeating processing of a regular task 511 executed at a predetermined period.

In the management task group 142, a monitoring task 521 for monitoring the inside of the controller, and obtaining log information, a dedicated port communication task 522 for performing dedicated port communications for debugging, and a dedicated port control task 523 for controlling a dedicated port are registered.

The controller 1 comprises an I/O interface 10, a network control circuit 11, and a timer 1602. The controller 1 is connected to the LAN 40 by the network control circuit 11, and to devices 301 to 30*n* (n is a positive integer) by the I/O interface 10, thus connected to an external device.

In the controller 1, a basic operation is carried out, i.e., tasks in each task group are executed in order from those in executable states and highest in priority by the task scheduler 160 of the real-time operating system 16. On the other hand, each task group is subjected to task execution control by a group unit, in such a manner that the tasks in the task group are changed in priority en block by the task group execution mode switching 15 periodically actuated based on interruption by the timer 16021, or the tasks in the group are suspended (SUSPEND) in block, or processing resumed (RESUME). Accordingly, for each mode switching, tasks to be executed or the execution order of tasks is varied.

FIG. 17 shows the software configuration operated on the controller of FIG. 16. However, a hardware configuration other than that of FIG. 16, for example the hardware configuration of FIG. 1 may be employed.

(Specific Operation)

Next, description is made of each task group and an operation of a task by way of specific example.

Figure 2:
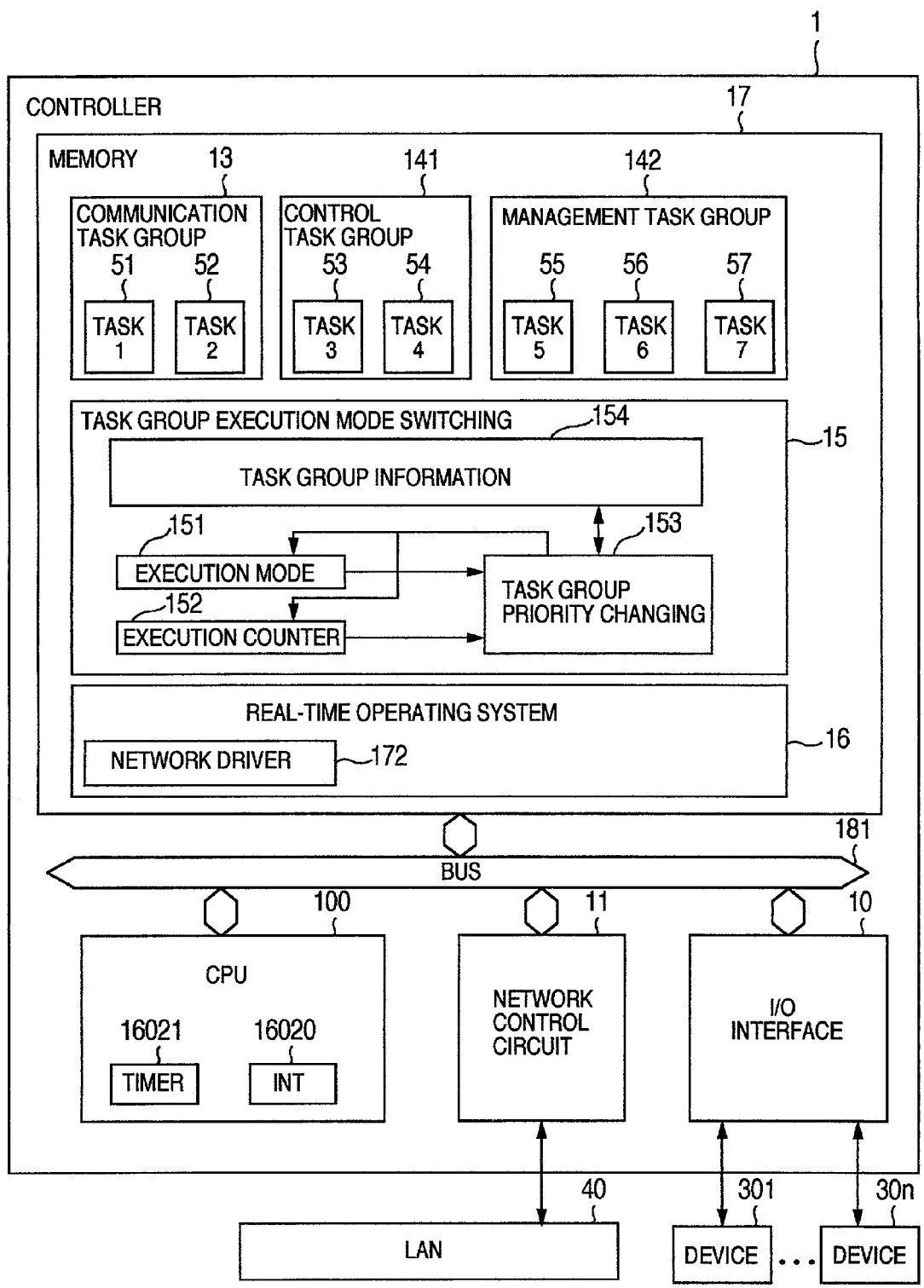
FIG. 2 is a block diagram showing a basic configuration of a first embodiment of task group mode execution switching according to the invention.

Here, it is assumed that in a configuration of the task group execution mode of FIG. 17, priority changing of the task group shown in FIG. 2 is carried out. There are three types of execution modes, i.e., a mode 0, a mode 1 and a mode 2 and, as shown in FIG. 3, priority deviation of the task groups is obtained during execution mode switching. In addition, a value of mode duration set in the execution counter is similar to that shown in FIG. 4. Task group information 154 has a structure similar to that shown in FIG. 5 or 6, and an operation of the task group priority changing 153 is similar to that shown in FIG. 7.

FIG. 18 shows initial priority of each of totally twelve tasks constituting the communication task group, the control task group and the management task group of FIG. 17 (a smaller value means higher priority). Though not shown in FIG. 18, if the task group execution mode switching 15 is constituted of tasks, priority of the task group execution mode switching 15 must be higher than priority of any one of the tasks in the task group of FIG. 17. Here, priority of the task group execution mode switching is set to 2.

The task group execution mode switching 15 is operated to add priority of priority deviation of FIG. 3 to these tasks during mode switching. As a result, priority of the task on each mode becomes similar to that shown in FIG. 19.

However, for priority addition of priority deviation with respect to initial priority during mode switching, priority deviation during switching of last mode→first mode, i.e., mode 2→mode 0 of FIG. 3 is used. For example, in a transmission task 1, on a mode 0, initial priority 3 is added to priority deviation 18 of mode 2→mode 0 to make 21.

Higher and lower relations in priority among the task group execution mode switching 15 and the task groups on each execution mode are as follows:

(1) Mode 0: task group execution mode switching>management task group>control task group>communication task group (2) Mode 1: task group execution mode switching>control task group>management task group>communication task group (3) Mode 2: task group execution mode switching>communication task group>control task group>management task group There are no changes made in a higher and lower relation in priority among the tasks of each task group.

Figure 20:
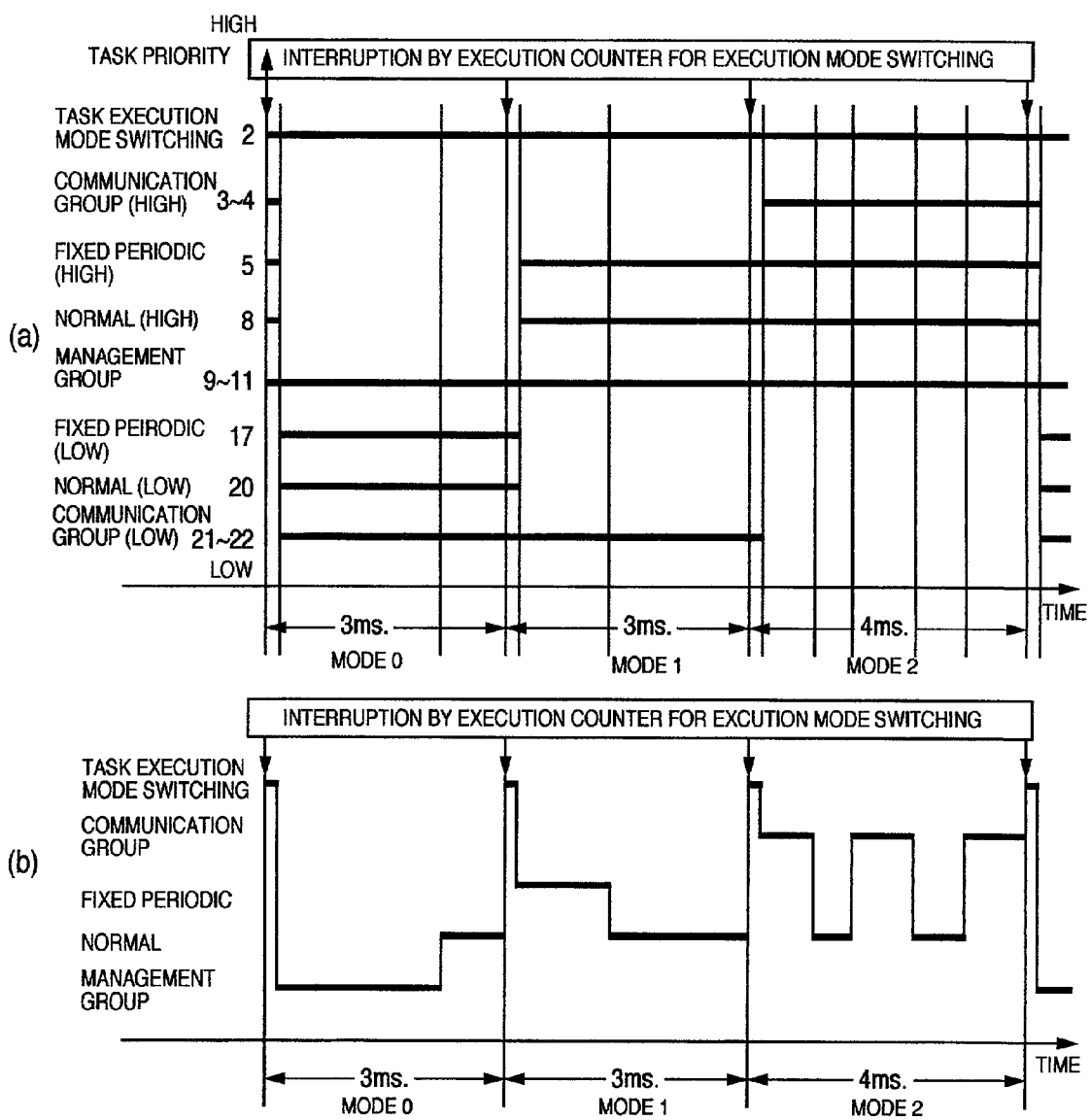
FIG. 20 is time charts illustrating a change in priority of the tasks by execution mode switching, and an execution example.

FIG. 20*a* is a graph showing FIG. 19 by a time chart. For example, on the mode 0, after execution of task execution mode switching, tasks for the management task group, the control group and the communication group are executed from those high in priority.

In addition, FIG. 20*b* is a graph showing a time chart of an execution example of each task. As shown in the graph of FIG. 20*b*, after an occurrence of interruption for execution mode switching by the execution counter, at a mode starting time, the task group execution mode switching 15 is executed, and task priority is changed. In a time zone of the mode 0, the management task group is preferentially executed; on the mode 1, the control task group; and on the mode 2, the communication task group.

In the embodiment, in the time zone of the mode 0, since the management task group is higher in priority than the other task groups, achievement of real-time control of the management task group is facilitated. Similarly, on the mode 1, achievement of real-time control of the control task group is facilitated; and on the mode 2, achievement of real-time control of the communication task group. Especially, as certain periodicity is required of a starting timing of each task for real-time processing, compatibility with mode switching having periodicity is high. On the other hand, in communication processing, especially receiving processing, since data is sent in irregularly from the LAN 40, even if the communication processing is carried out only in the time zone of the mode 2 as in the case of the embodiment, a packet receiving buffer is increased to prevent a capturing failure of packets sent in from the LAN 40 as much as possible. Thus, at least guaranteeing of throughput of the communication processing is facilitated.

(Fourth Embodiment: Task Group Suspension/Resumption)

Next, description is made of other operations of each task group and a task of FIG. 17 by way of specific example.

Here, in a configuration of the task group execution mode switching 15, task group suspension/resumption of FIG. 11 is carried out. There are three types of execution modes, i.e., a mode 0, a mode 1 and a mode 2, and an execution state of the task group is changed during execution mode switching. On the other hand, a value of mode duration set in the execution counter is similar to that shown in FIG. 14. Task group information has a structure similar to that shown in FIG. 5 or 6, and an operation of the task group suspension/resumption processing 1531 is similar to that shown in FIG. 13.

Initial priority of each of totally twelve tasks constituting the communication task group, the control task group and the management task group of FIG. 17 is similar to that shown in FIG. 18 (a smaller value means higher priority). Though not shown in FIG. 17, if the task group execution mode switching 15 is constituted of tasks, priority of the task group execution mode switching 15 must be higher than priority of any one of the tasks in the task group of FIG. 17. Here, priority of the task group execution mode switching is set to 2.

FIG. 21 shows an execution state of a task on each mode, as a result of changes made in the execution states of the totally seven tasks 1 to 7 of FIG. 1 by the operation of the task group execution mode switching 15 during mode switching of FIG. 12. In FIG. 21, suspension means one of forcible standby states (SUSPENDED or WAITING-SUS-PENDED). This is equivalent to, when a need arises to suspend a task because of mode switching, any one of the following states, in which the task has been, i.e., an execution state (RUNNING), an executable state (READY) and a standby state (WAITING). Conversely, execution means a return of a task state to one selected from RUNNING, READY and WAITING. In a dormant state of a task (DORMANT), no state changes are made irrespective of task suspension/execution.

Execution states of the task groups on respective modes are as follows:

(1) Mode 0: a communication task group and a control task group are suspended. A management task group is executed.

(2) Mode 1: the communication task group is suspended. The control task group and the management task group are executed.

(3) Mode 2: the communication task group, the control task group and the management task group are all executed.

Figure 22:
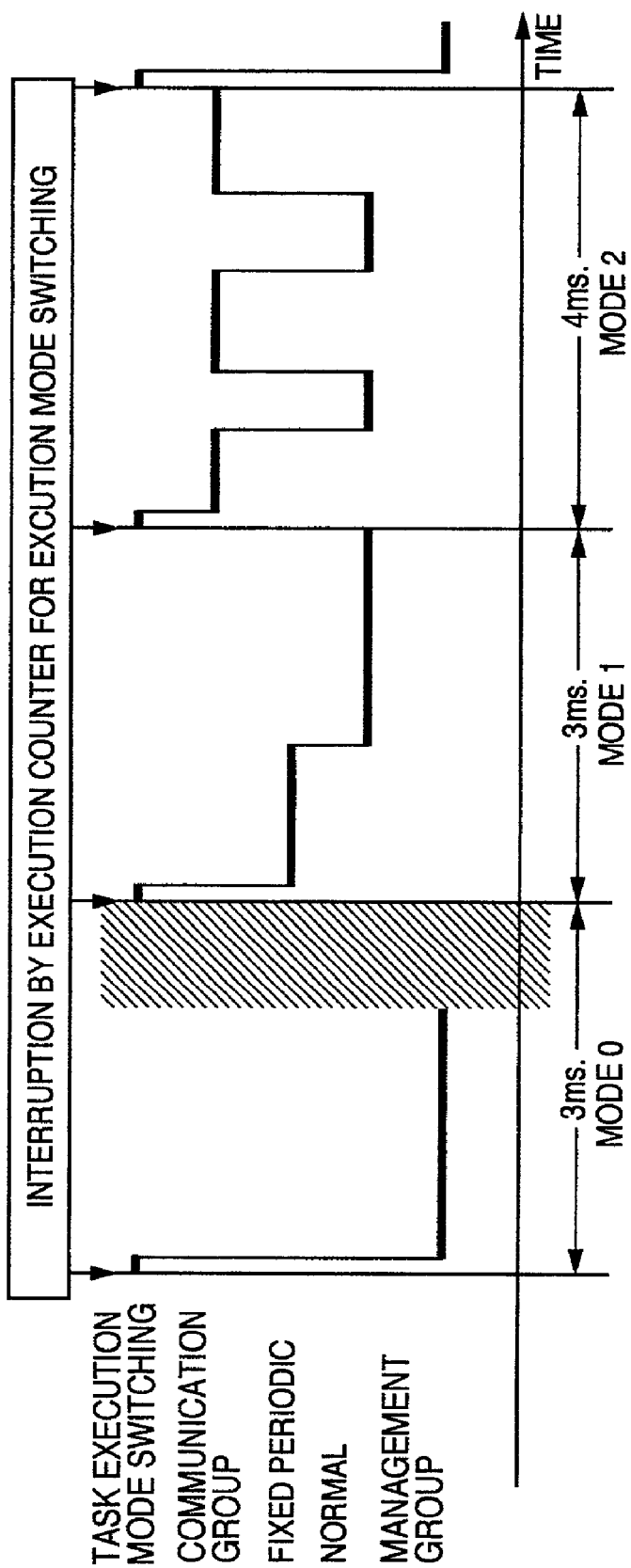
FIG. 22 is a time chart illustrating a task execution example by execution mode switching.

FIG. 22 is a graph showing a time chart of an execution example of each task of FIG. 21. As shown in the graph of FIG. 22, after an occurrence of interruption during execution mode switching by the execution counter, at time of mode starting, the task group execution mode switching 15 is executed, and changes are made in execution states of the tasks. In a time zone of the mode 0, since the control task group and the communication task group are both suspended, only the management task group is executed. On the mode 1, execution of the control task group is resumed, and execution is made preferentially from the management task group. On the mode 2, execution of the communication task group is resumed, and this group is preferentially executed before the other task groups. A difference from the graph of FIG. 20B is that even if execution of all the tasks of the management task group is finished in the middle of the mode 0, no tasks are present any more to be executed, and thus there is a high possibility of idling of the CPU 100 (see a hatched line portion of FIG. 22).

An advantage of the second embodiment of the task group execution mode switching 15 is basically similar to that of the first embodiment. A difference is that since the CPU becomes idle more frequency than in the first embodiment, and processing time is shorter for the task suspension/resumption than for the changing of the priority of the tasks of the first embodiment during mode switching, overhead is smaller than that of the first embodiment during mode switching.

(Fifth Embodiment: Mode Set Time Change Multipattern)

(Task Group Execution Mode Switching)

Figures 23, 24:
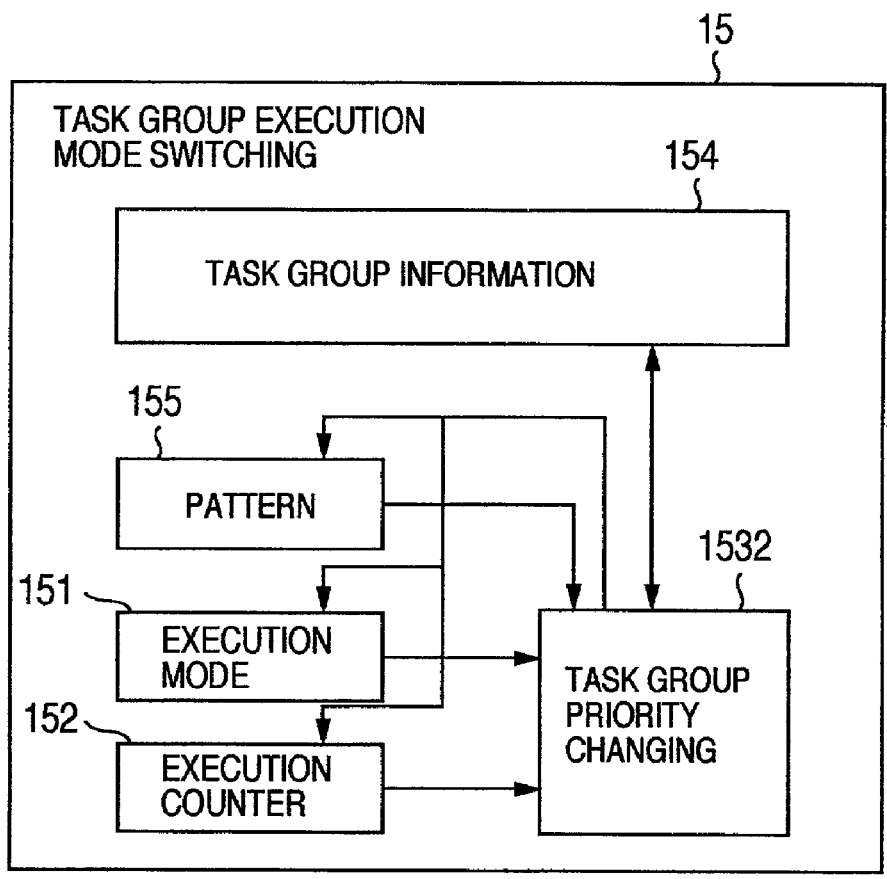
FIG. 23 is a block diagram showing a third configuration of task group mode execution switching.
FIG. 24 is an explanatory view showing a mode duration value set in an execution counter on each pattern.

FIG. 23 shows a third embodiment of task group execution mode switching 15.

The task group execution mode switching 15 includes an execution mode 151, an execution counter 152, task group priority changing 1532, task group information 154, and a pattern 154. The execution mode 151, the execution counter 152, and the task group information 154 are basically similar to those of the previous embodiments. In the task group priority changing 1532, processing for referring/updating the pattern 155 is added to the previous embodiment, which will be described in detail later.

The task execution mode switching 15 includes interruption processing or a task. In the latter case, priority of the task execution mode switching 15 is set highest, or at least higher than priority of any tasks constituting the task group as a target to be monitorially controlled.

The setting of mode duration in the execution counter was fixed in the first embodiment. In the described embodiment, however, on each pattern, flexibility is provided in this regard. Specifically, the mode duration set in the execution counter shown in FIG. 4 is defined as one pattern and, by providing a plurality of such patterns as shown in FIG. 24, the task group execution switching 15 cane be operated in any patterns. Identification of this pattern is achieved by the pattern 155.

In FIG. 24, as a pattern 0, duration of a mode 0 is set to 3 milli-sec.; duration of a mode 1 to 3 milli-sec.; and duration of a mode 2 to 4 milli-sec. (similar to that shown in FIG. 4, and one cycle is set to 10 milli-sec.) On the other hand, as a pattern 1, duration of the mode 0 is set to 2 milli-sec.; duration of the mode 1 to 2 milli-sec.; and duration of the mode 2 to 6 milli-sec. FIG. 24 shows only an example. Thus, needless to say, a value of mode duration set on each execution mode, the number of modes, and the number of patterns can be optionally set.

Figure 25:
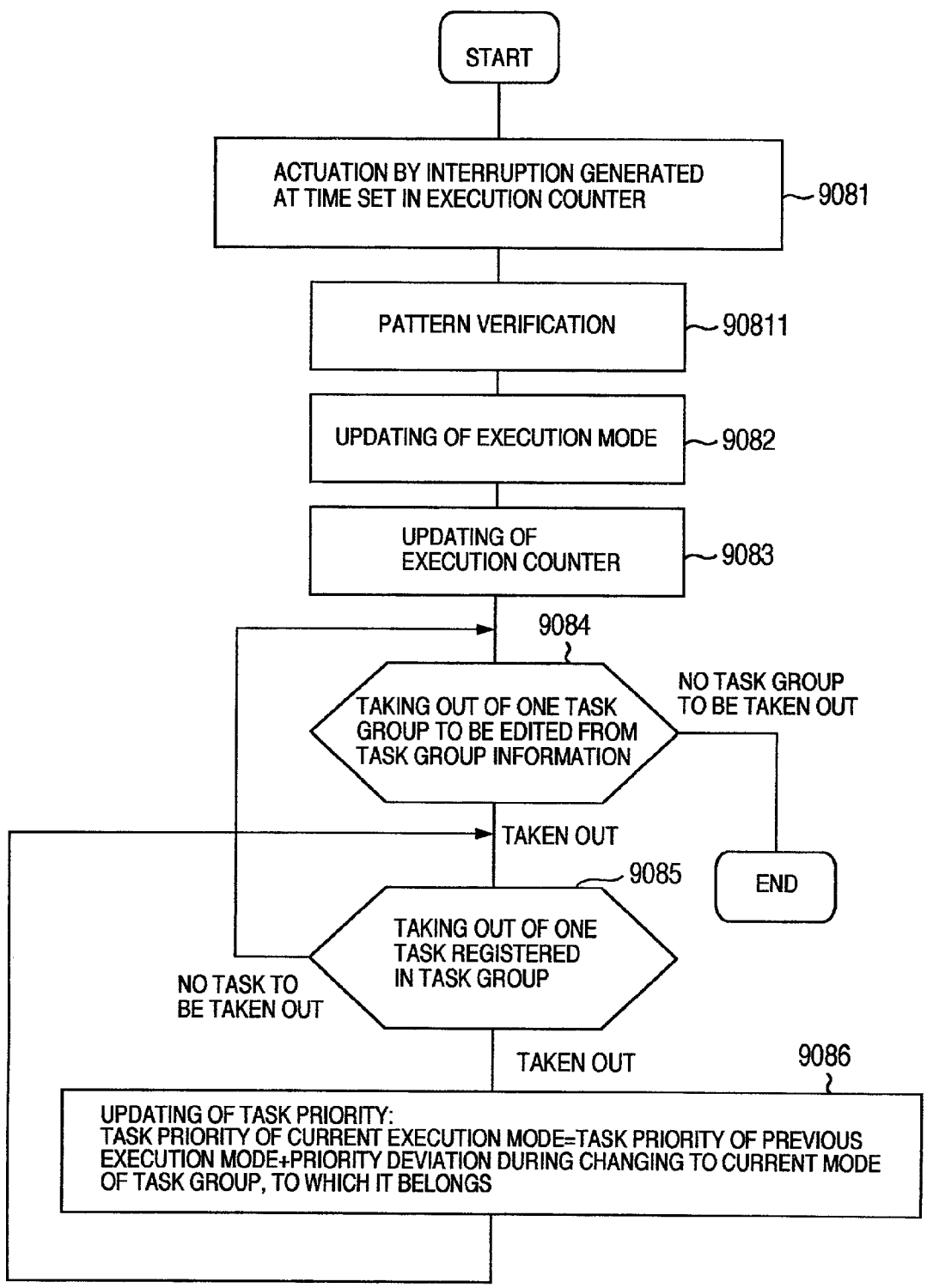
FIG. 25 is a flowchart illustrating an operation of task group execution mode switching.

A flowchart of FIG. 25 shows an operation of the task group priority changing 1532 (=operation of the task group execution mode switching 15).

First, with a passage of the time previously set in the execution timer 152, interruption occurs form the timer, and the task execution mode switching 15 is actuated (9081). After its actuation, the task group priority changing 1532 first refers to pattern information set in the pattern 155 (90811), and updates an execution mode (9082). The updating of the execution mode is achieved by calculation described below.

New execution mode number=previous execution mode (number of all (number+1) % modes) By referring to a list of mode duration values set in the execution counter for a current pattern, duration of the new execution mode is set in the execution counter (9083).

Then, one task group to be edited is taken out by referring to the task group information 154 (9084). Then, for all tasks registered in the task group (9085), task priority is updated (9086). The updating is achieved by calculation below.

Priority of task of current execution mode=priority of previous execution mode+priority deviation during switching to current mode of task group to which it belongs (see a list of priority deviation of task group during mode switching)

The above-described calculation is carried out for all the tasks of all the task groups registered in the task group information 154.

(Specific Operation Example)

Next, description is made of the third embodiment of the task group execution mode switching shown in FIG. 23, by using a specific example of an operation of each task group and a task of FIG. 17.

Here, there are three types of execution modes, i.e., a mode 0, a mode 1 and a mode 2 and, as shown in FIG. 3, priority deviation of the task groups is obtained during execution mode switching. A value of mode duration set in the execution counter is similar to that shown in FIG. 24. The task group information 154 has a structure similar to that of FIG. 5 or 6, and an operation of the task group priority changing 1532 is similar to that shown in FIG. 25.

Initial priority of each of totally twelve tasks constituting the communication task group, the control task group, and the management task group of FIG. 17 is similar to that shown in FIG. 18 (a smaller value means higher priority). Though not shown, priority of the task group execution mode switching 15 is set to 2.

The task group execution mode switching 15 is operated to add priority of priority deviation of FIG. 3 to these tasks during mode switching. As a result, priority of the task on each mode becomes similar to that shown in FIG. 19. However, for the addition of the priority of the priority deviation during mode switching to the initial priority, priority deviation during switching of last mode→first mode, i.e., mode 2→mode 0 of FIG. 3 is used. Higher and lower relations in priority among the group execution mode switching 15 and the task groups on each execution mode are as follows:

(1) Mode 0: task group execution mode>management task group>control task group>communication task group
(2) Mode 1: task group execution mode switching>control task group>management task group>communication task group
(3) Mode 2: task group execution mode switching>communication task group>control task group>management task group There are no changes made in a higher and lower relation in priority among the tasks of each task group.

Figure 26:
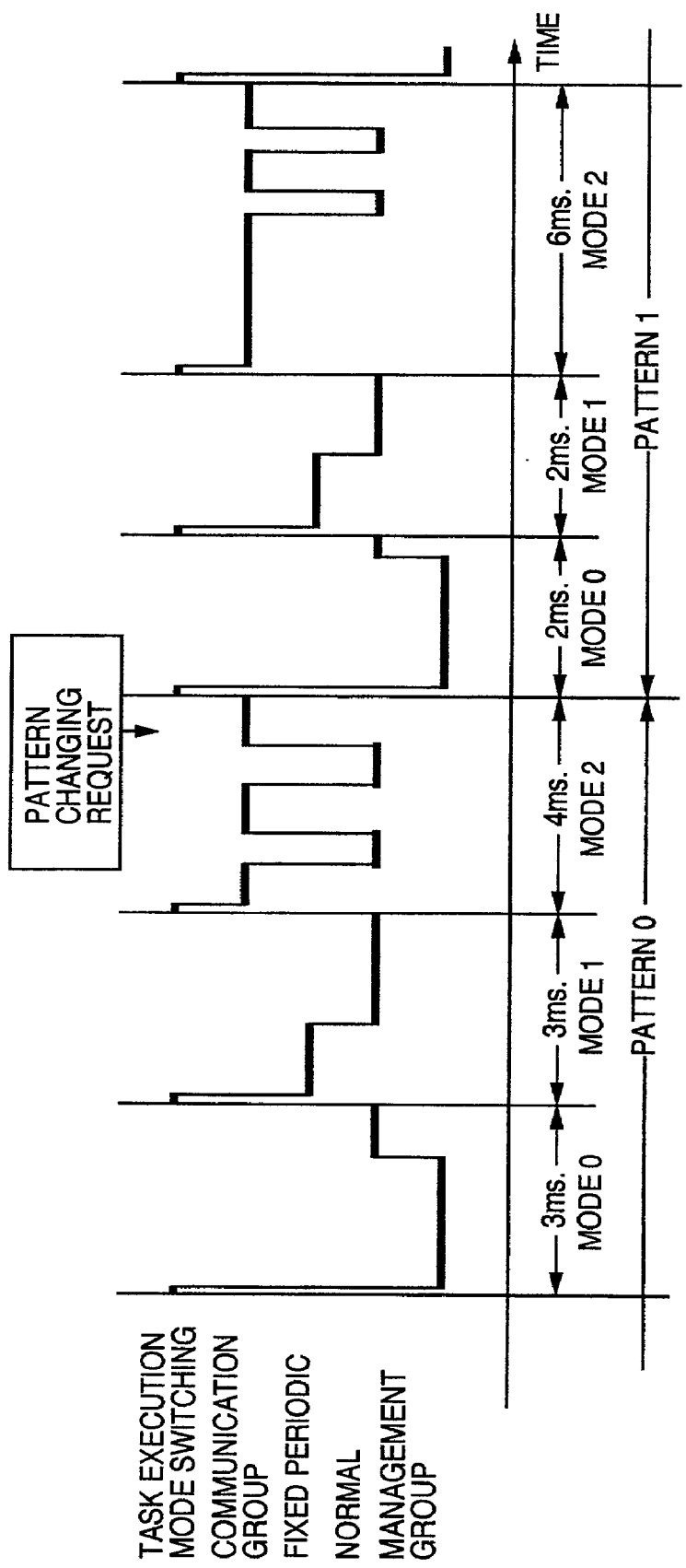
FIG. 26 is a time chart illustrating a task execution example by pattern and execution mode switching.

FIG. 26 is a graph showing a time chart when pattern switching occurs. As shown in the graph, after interruption occurs for execution mode switching by the execution counter, at each mode starting time, the task group execution mode switching 15 is executed to change task priority.

In a pattern 0, as in the case of FIG. 20b, in a time zone of a mode 0, a management task group is preferentially executed; on a mode 1, a control task group; and on mode 2, a communication task group. Here, when a pattern changing request is made (in the drawing, in the midway of first mode 2), patterns are switched from the pattern 0 to a pattern 1 at next mode switching time, i.e., switching of mode 2→mode 0, and durations of the modes 0, 1 and 2, which have been respectively 3 milli-sec., 3 milli-sec., and 4 milli-sec., are changed to 2 milli-sec., 2 milli-sec., and 6 milli-sec., after the pattern changing.

Therefore, even if a change occurs in an operation situation of the system, to which the controller 1 of the invention is applied, switching is made to a running state suitable for the operation situation, for example to the pattern 0 of FIG. 24 in a small load situation of the network communications, or to the pattern 1 in a large load situation of the network. Thus, the controller 1 can be efficiently operated.

As described above, according to the third embodiment of the task group execution mode switching 15, the pattern 155 was applied for the first embodiment of the task group execution mode switching 15, i.e., priority changing of the task groups. Needless to say, however, it can also be applied to the second embodiment of the task group execution mode switching 15, i.e., task group suspension/resumption processing.

(Sixth Embodiment: Multipattern for Changing Number of Modes)

(Task Group Execution Mode Switching)

As described above, in the third embodiment of the task group execution mode switching 15, as shown in FIG. 24, the total number of modes for each pattern was unchanged, and only the value of mode duration in the execution counter was changed. However, as shown in FIG. 27, for each pattern, it is possible to change not only the number of modes, and mode duration set in each execution counter, but also the number of modes set therein.

In FIG. 27, as a pattern 0, the number of modes is set to 3; duration of a mode 0 is set to 3 milli-sec.; duration of a mode 1 to 3 milli-sec.; and duration of a mode 2 to 4 milli-sec. (similar to that shown in FIG. 4, and one cycle is set to 10 milli-sec.). On the other hand, as a pattern 1, the number of modes is set to 4; duration of the mode 0 is set to 3 milli-sec.; duration of the mode 1 to 2 milli-sec.; duration of the mode 2 to 1 milli-sec.; and duration of the mode 3 to 4 milli-sec. FIG. 27 shows only an example. Thus, needless to say, a value of mode duration set on each execution mode, the number of modes, and the number of patterns can be optionally set.

FIG. 28 shows a list of priority deviation of the task groups during mode switching in the pattern 0. FIG. 28 is similar to FIG. 3, where mode switching of the pattern 0 is similar to that of the pattern 0 of the previous embodiment, or the mode switching of the first embodiment.

FIG. 29 shows a list of priority deviation of the task groups during mode switching in the pattern 1. Here, there are four types of execution modes, i.e., a mode 0, a mode 1, a mode 2, and a mode 3, and the modes are cyclically switched as follows:

Mode 0→mode 1→mode 2→mode 3→mode 0→ . . .

In addition, during mode switching shown below, priority of deviation is added to all the tasks in each task group.

(1) During switching of mode 3→mode 0,
18 is added to priority of all the tasks in the communication task group,
12 is added to priority of all the tasks in the control task group,
no changes are made in priority of all the tasks in the management task group.

(2) During switching of mode 0→mode 1,
no changes are made in priority of all the tasks in the communication task group,
−12 is added (12 is subtracted) to priority of all the tasks in the control task group, and
no changes are made in priority of all the tasks in the management task group.

(3) During switching of mode 1→mode 2,
−15 is added (15 is subtracted) to priority of all the tasks in the communication task group,
no changes are made in priority of all the tasks in the control task group, and
no changes are made in priority of all the tasks in the management task group.

(4) During switching of mode 2→mode 3,
−3 is added (3 is subtracted) to priority of all the tasks in the communication task group,
no changes are made in priority of all the tasks in the control task group, and
no changes are made in priority of all the tasks in the management task group.

In the pattern 0, the task group execution mode switching 15 is operated to add priority of priority deviation of FIG. 28 (=FIG. 3) to these tasks during mode switching. As a result, priority of the task on each mode becomes similar to that shown in FIG. 19 as in the case of the pattern 0 of the previous embodiment. Higher and lower relations in priority among the group execution mode switching 15 and the task groups on each execution mode are as follows:

(1) Mode 0: task group execution mode>management task group>control task group>communication task group
(2) Mode 1: task group execution mode switching>control task group>management task group>communication task group
(3) Mode 2: task group execution mode switching>communication task group>control task group>management task group In the pattern 1, the task group execution mode switching 15 is operated to add priority of priority deviation of FIG. 29 to the tasks during mode switching. As a result, priority of the task on each mode of the pattern 1 becomes similar to that shown in FIG. 30. Higher and lower relations in priority among the group execution mode switching 15 and the task groups on each execution mode are as follows:

(1) Mode 0: task group execution mode>management task group>control task group>communication task group
(2) Mode 1: task group execution mode switching>control task group>management task group>communication task group
(3) Mode 2: task group execution mode switching>fixed periodic task in control task group>communication task group>normal task in control task group>management task group
(4) Mode 3: task group execution mode>communication task group>control task group>management task group. There are no changes made in a higher and lower relation in priority among the tasks of each task group.

Figure 31:
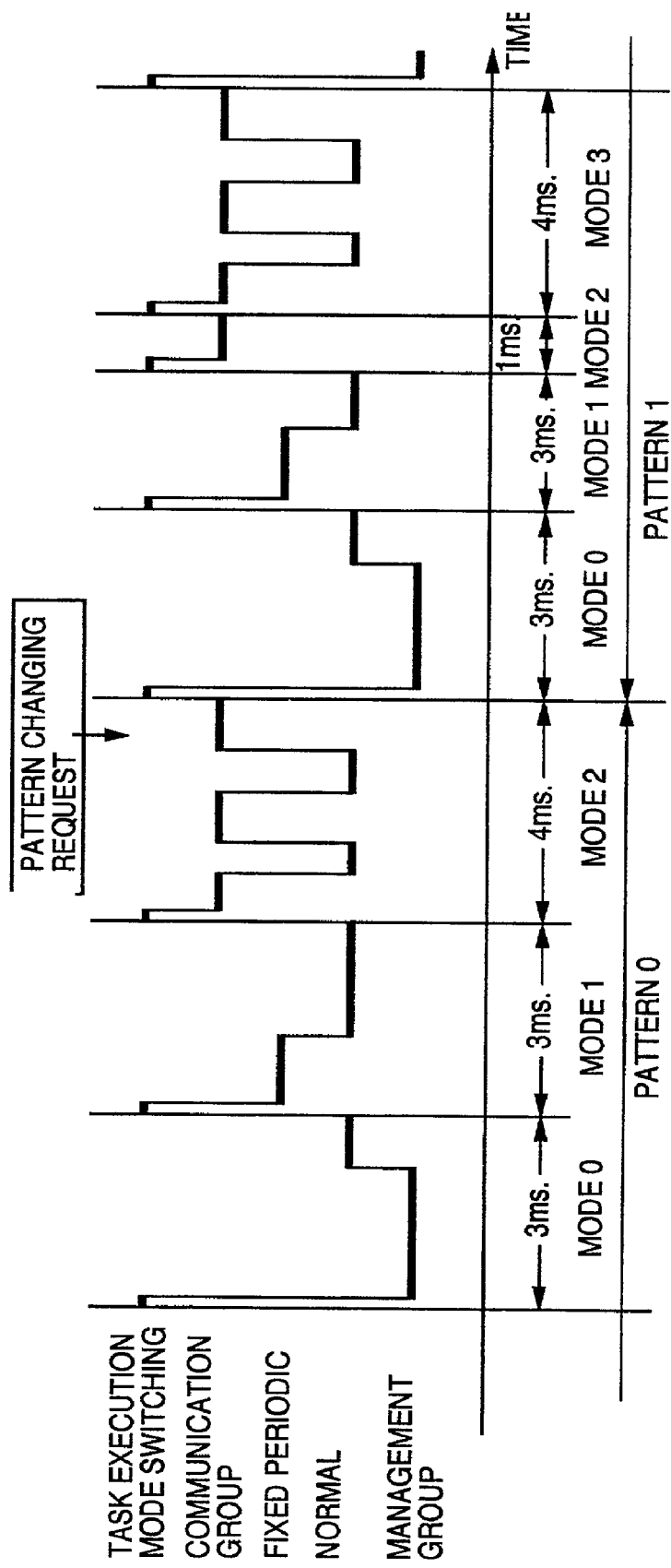
FIG. 31 is a time chart illustrating a task execution example by pattern and execution mode switching.

FIG. 31 is a graph showing a time chart of task execution of the embodiment. As shown in the graph of FIG. 31, in the pattern 0, as in the case of FIG. 20 (b), after interruption occurs for execution mode switching by the execution counter, at each mode starting time, the task group execution mode switching 15 is executed to change task priority. Here, when a pattern changing request is made (in the drawing, in the midway of first mode 2), patterns are switched from the pattern 0 to the pattern 1 at next mode switching time, i.e., switching of mode 2 →mode 0, and durations of the modes 0, 1 and 2, which have been respectively 3 milli-sec., 3 milli-sec., and 4 milli-sec., are changed, with one mode added to make the mode 0, the mode 1, the mode 2, and the mode 3, to 3 milli-sec., 2 milli-sec., 1 milli-sec., and 4 milli-sec., after the pattern changing.

According to the embodiment, even if a change occurs in an operation situation of the system, to which the controller 1 of the invention is applied, switching can be made to a running state suitable for the operation situation more flexibly than that first shown in the third embodiment. Thus, the controller 1 can be efficiently operated.

As described above, according to the embodiment which supplements the third embodiment of the task group execution mode switching 15, the pattern 155 was applied for the first embodiment of the task group execution mode switching 15, i.e., priority changing of the task groups. Needless to say, however, it can also be applied to the second embodiment of the task group execution mode switching 15, i.e., task group suspension/resumption processing.

(Seventh Embodiment: Multipattern Control by Receiving Buffer Vacancy Monitoring)

In the foregoing third embodiment and the supplemental embodiment of the task group execution mode switching 15, the arrangement of changing the duration of each execution mode and the number of modes by applying the pattern 155 was provided. Hereinafter, description is made of an application example of this arrangement.

Figure 32:
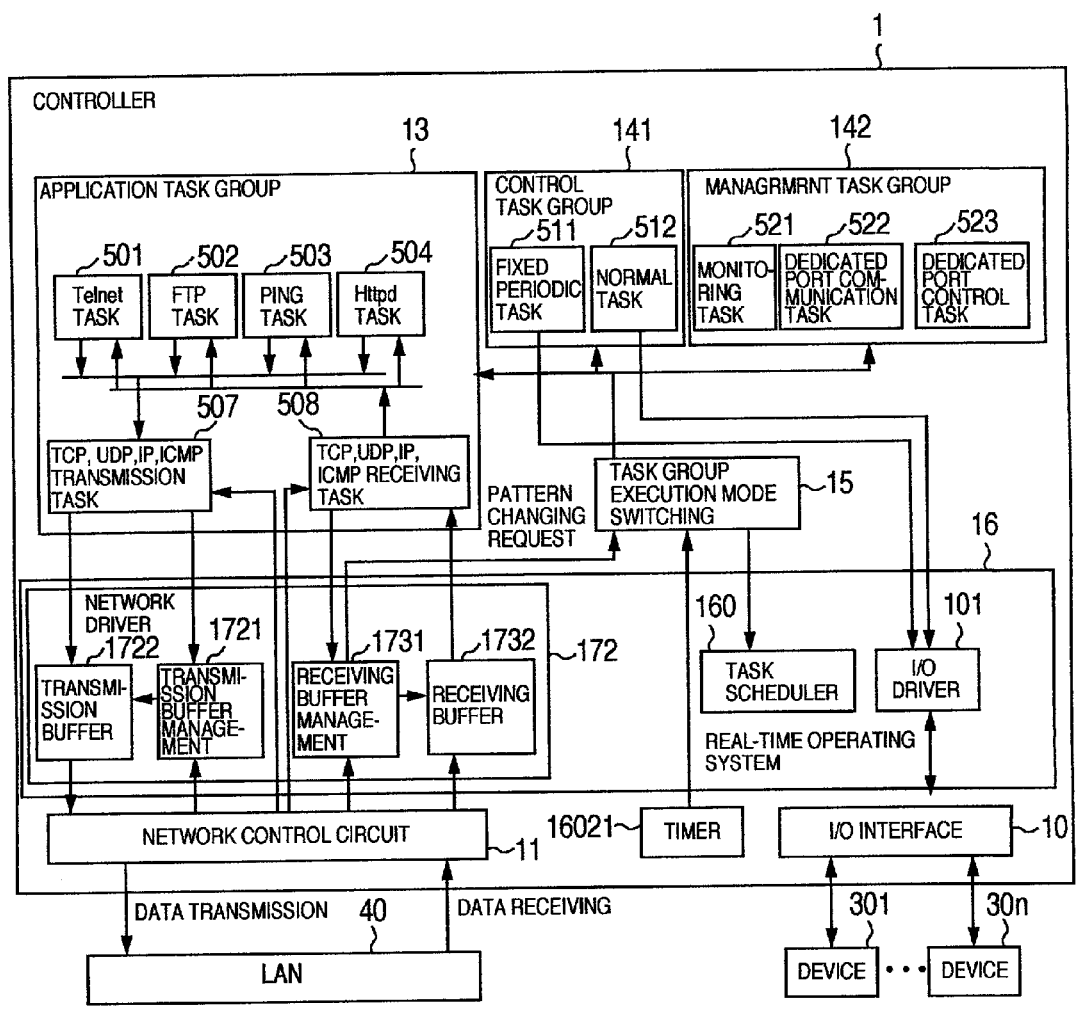
FIG. 32 is a block diagram showing a software configuration of the controller of the invention.

FIG. 32 is a view focusing on a software configuration operated on the controller of FIG. 17, where a pattern changing request (switching command of a running pattern) can be issued to the task execution mode switching 15 by the receiving buffer 173 in the network driver 172. For easier explanation, FIG. 33 shows the task execution mode switching 15 cut out from the receiving buffer 1731 in the network driver 172 of FIG. 32.

Figure 33:
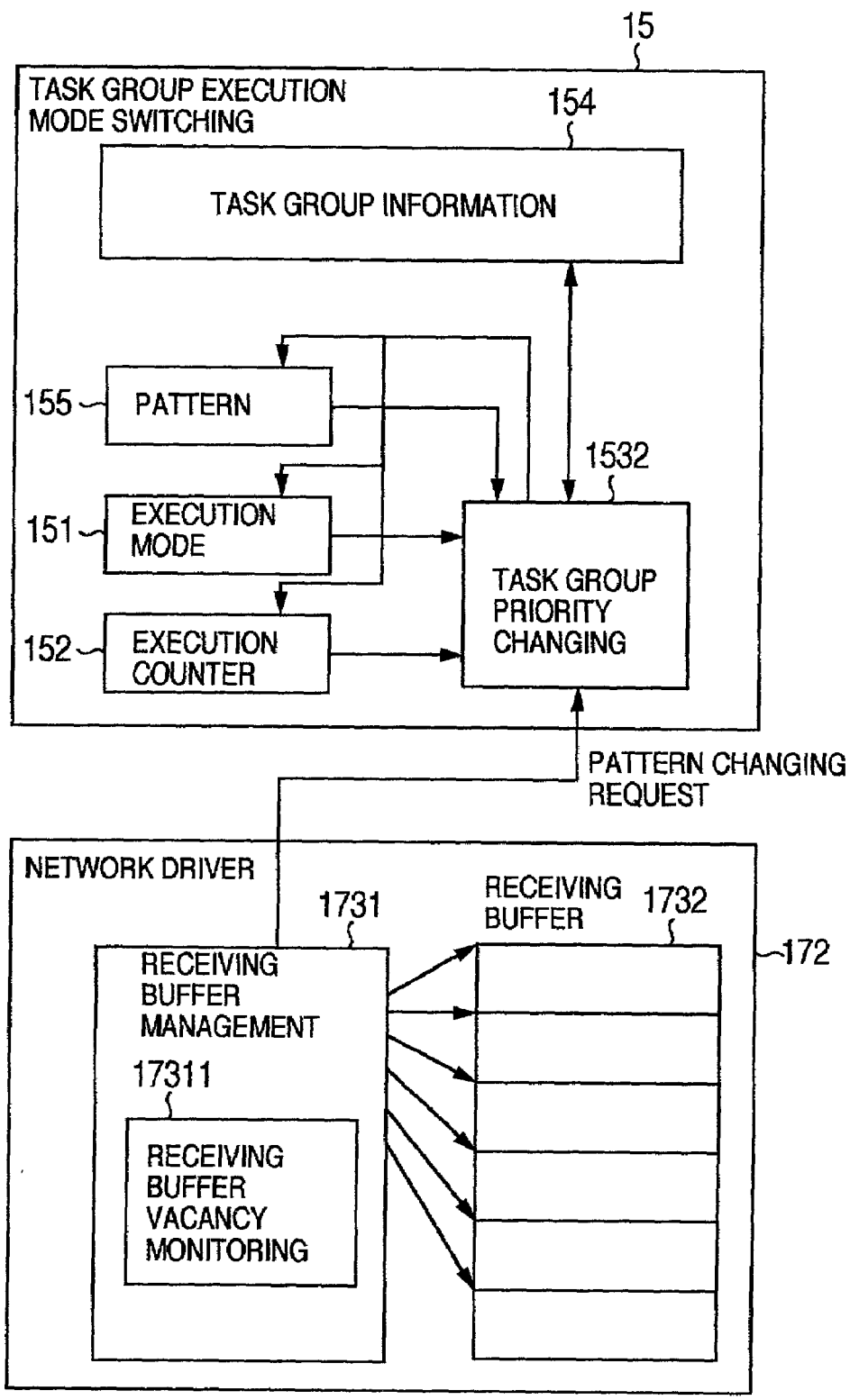
FIG. 33 is a block diagram showing a configuration of a network driver for switching a task group execution mode and requesting a pattern change.

In FIG. 33, the task group execution mode switching 15 is similar to that shown in FIG. 23. The network driver 172 is constructed as received information monitoring means for monitoring a quantity of communication information obtained from communications with the LAN 40, and outputting a pattern changing request (switching command of a running state) to the task group execution mode switching 15 in accordance with the quantity of received information. In the embodiment, for easier explanation, there are shown only receiving buffer management 1731 and a receiving buffer 1732 inside. The receiving buffer management 1731 incorporates a receiving buffer vacancy monitor 17311. The receiving buffer vacancy monitor 17311 monitors a use situation of the receiving buffer 1732, and issues a pattern changing request to the task group execution mode switching 15 when buffer vacancy is reduced.

Figure 34:
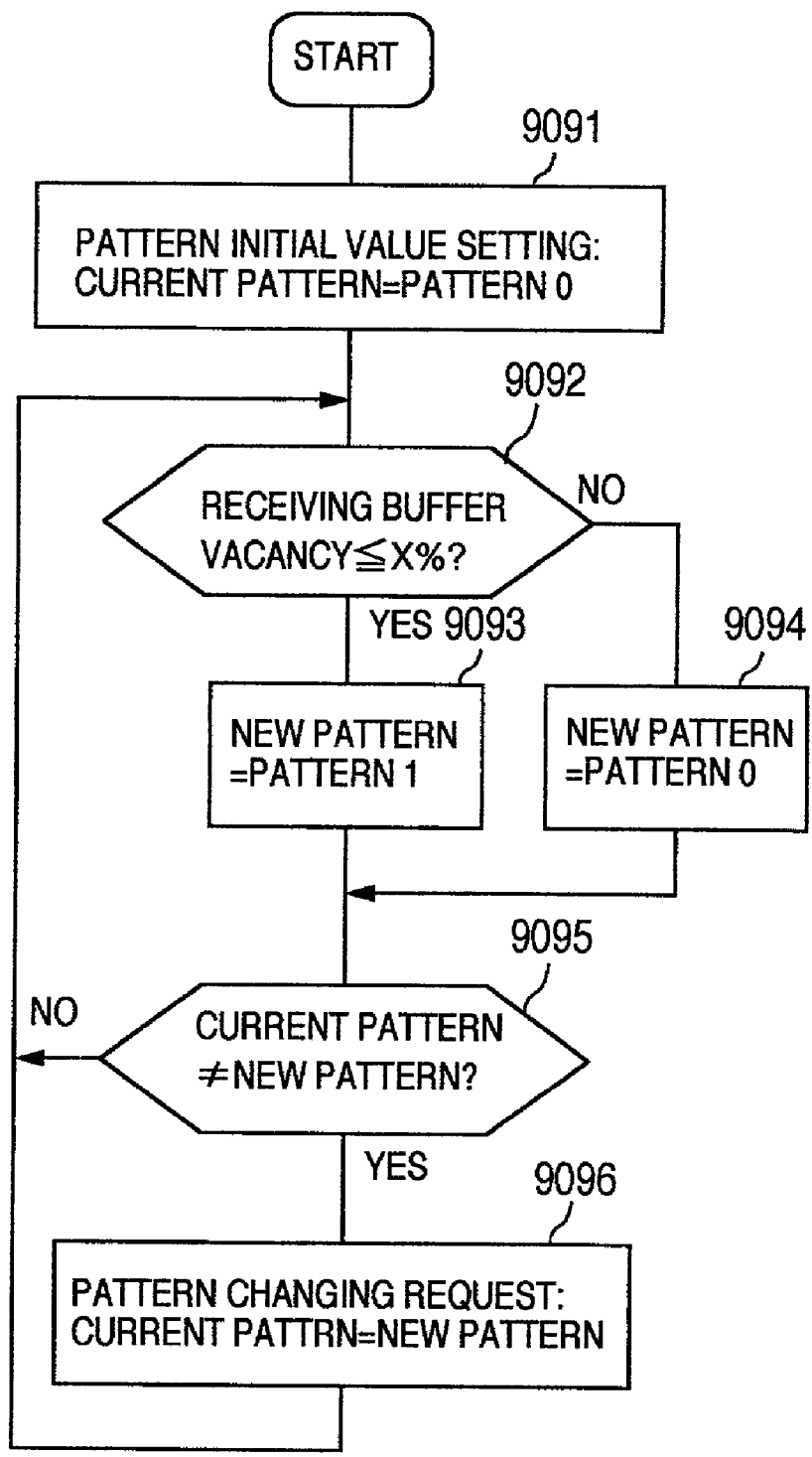
FIG. 34 is a flowchart illustrating an operation of receiving buffer vacancy monitoring.

FIG. 34 shows an operation flow of the receiving buffer vacancy monitor 17311. First, an initial pattern value is set to realize current pattern=pattern 0 (9091). Then, vacancy of the receiving buffer 1732 is monitored and, if a vacant area is equal to X% or lower (X is a numeral from 0 to 100)

(9092), new pattern=pattern 1 is set (9093). If otherwise, new pattern=pattern 0 is set (9094). Subsequently, the current pattern is compared with the new pattern (9095) and, if both coincide with each other, the process returns to 9092. On the other hand, if there is no coincidence between the two, current pattern=new pattern is set, and a pattern chancing request is issued to the task group execution mode 15 (9095).

The patterns 0 and 1 of FIG. 34 are equivalent to, for example, the patterns 0 and 1 of the third embodiment and the supplemental embodiment of the task group execution mode 15 described above. In this case, a vacant area is reduced to make a change of pattern 0→pattern 1, increasing a time zone where the communication task group is preferentially executed. Thus, a probability of overflowing of the receiving buffer can be reduced.

The embodiment has been described with reference to the case where the task group execution mode switching 15 changes priority of the task groups. However, the embodiment can also be applied to a case of task group suspension/resumption.

The vacancy monitoring of the receiving buffer was described. Needless to say, however, vacancy monitoring of the transmission buffer can be executed.

Figure 38:
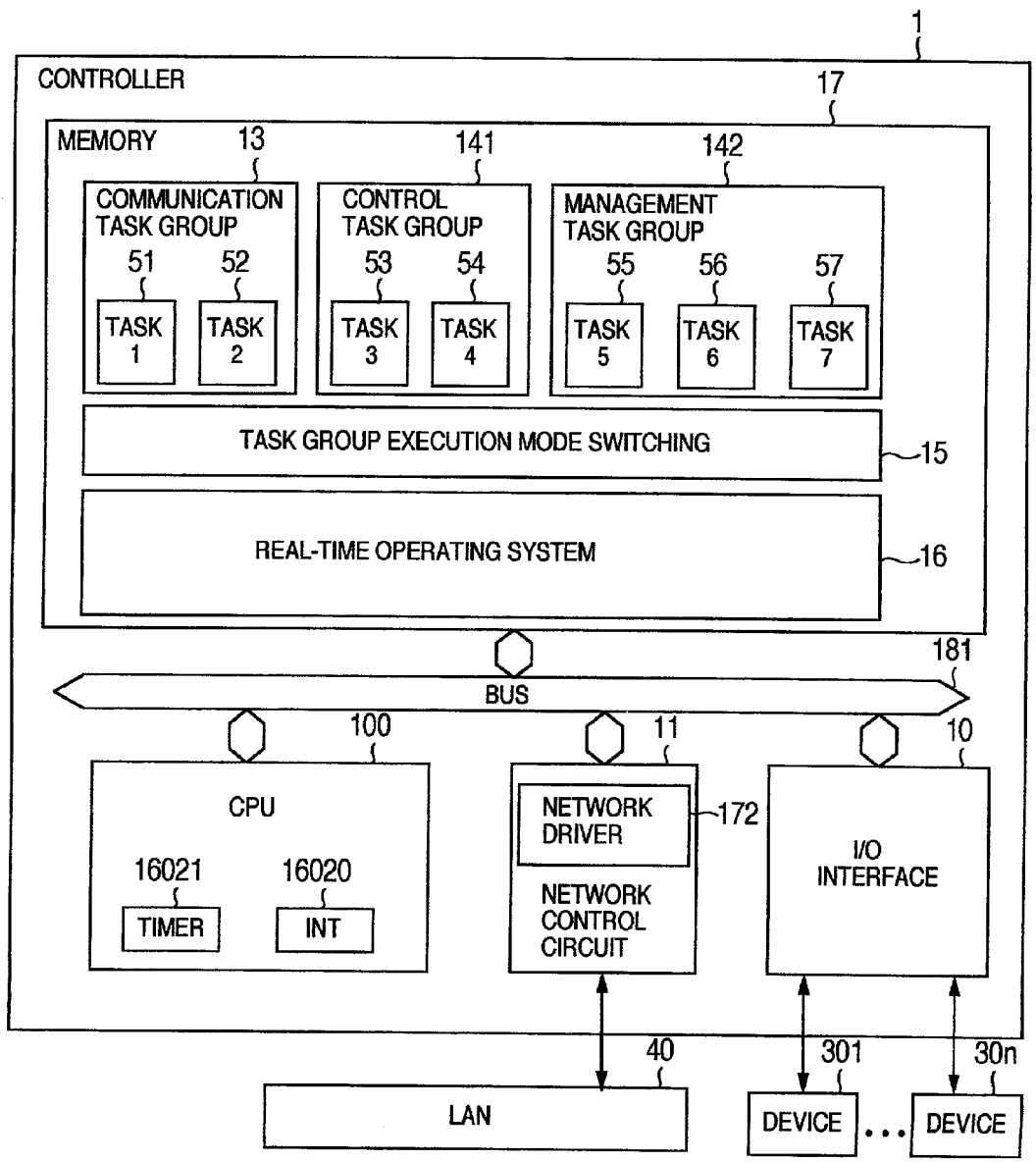
FIG. 38 is a block diagram showing a basic configuration of a controller including a network driver function achieved by a network control circuit.

The network driver 172 of the embodiment was mainly by software. However, as shown in FIG. 38, all or a part of functions of the network driver 172 can be realized by hardware. FIG. 38 shows an example where a function of the network driver 172 is realized by hardware on the network control circuit 11.

(Eight Embodiment: Reduction of Network Communication Interruption by Control Register Setting)

In the foregoing embodiments, the communication task group was controlled by changing task priority or suspension/resumption. Now, description is made of a simple and small overhead method for controlling the communication task group.

Figures 35, 36:
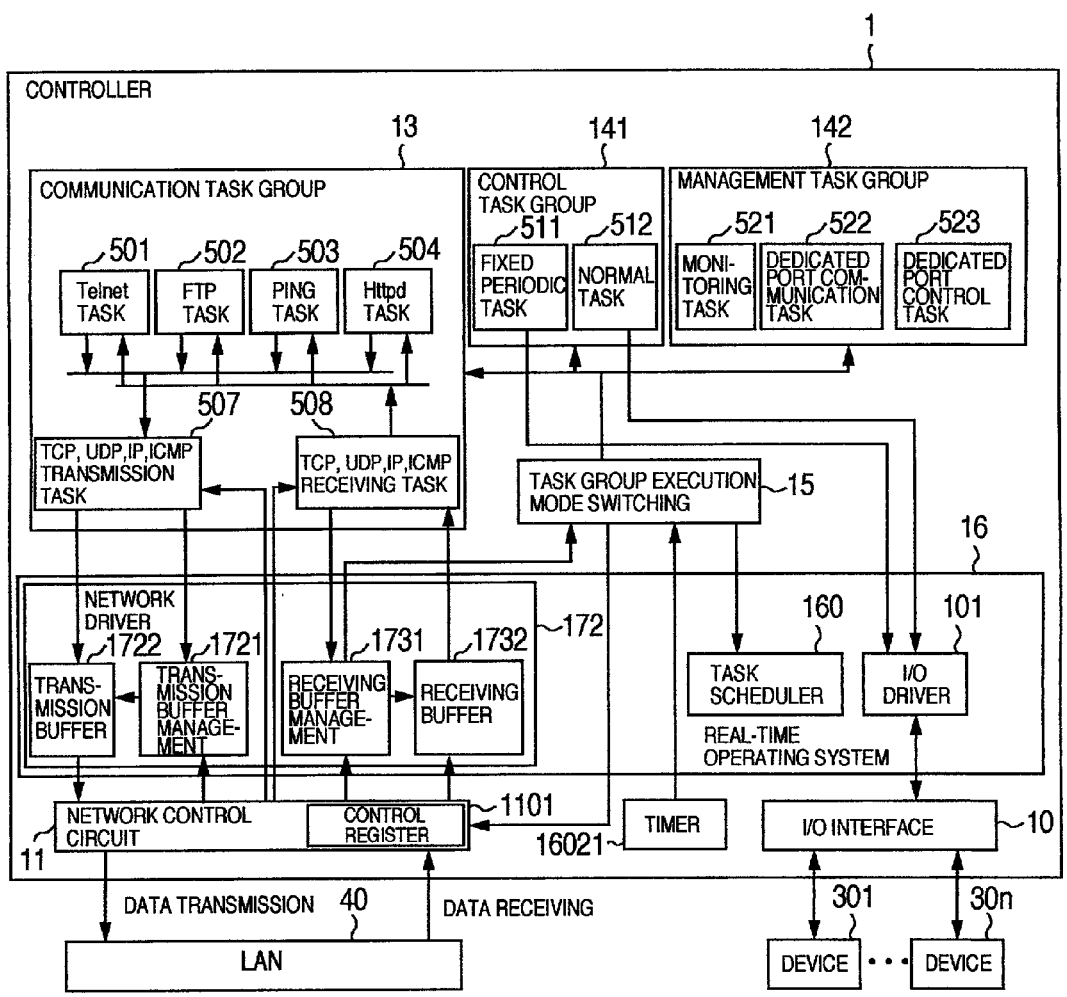
FIG. 35 is a block diagram illustrating a software configuration of the controller of the invention.
FIG. 36 is an explanatory view showing a change in control register setting of a network control circuit during execution mode switching.

FIG. 35 shows an arrangement where a control register 1101 in the network control circuit 11 can be controlled by the task group execution mode switching 15 in FIG. 32. The setting of the control register 1101 generally enables reception/transmission interruption from the network control circuit 11 to be masked. Accordingly, instead of priority changing or suspension/resumption by the task group execution mode switching 15, interruption from the network control circuit 11 is masked or unmasked by the setting of the control register 1101, and thus the operation of the communication task group is controlled.

FIG. 36 shows an example of changing control register setting of the network control circuit during mode switching. In mode 2→mode 0, the setting of the control register 1101 is changed in order to mask interruption from the network control circuit 11. In mode 0→mode 1, no setting changes are made. In mode 1→mode 2, the setting of the control register 1101 is changed in order to unmask the interruption from the network control circuit 11.

Here, as in the forgoing, it is assumed that priority of the communication task group is higher than any other task groups, as shown in FIG. 18. In the modes 0 and 1, since the interruption from the network control circuit 11 is masked, a TCP, UDP, IP and ICMP transmission task 507, and a TCP, UDP, IP and ICMP receiving task 508 of FIG. 35 are not actuated by the network control circuit 11. Especially, if no receiving interruptions occur, the receiving task 508 is not actuated, and higher-order communication application tasks 501 to 504 are not actuated. Accordingly, in the modes 0 and 1, since almost no tasks are operated in the communication task group, other task groups are preferentially executed. On the other hand, on the mode 2, interruption occurs from the network control circuit 11, and the network task group is normally actuated. Moreover, since priority of the communication task group is higher than any other tasks, this task group is executed before the others.

Needless to say, the changing of the control register setting of the network control circuit described above can be executed in combination with the forgoing embodiments of various task group execution mode switching 15.

(Hardware Configuration of Task Execution Mode Switching 15)

Figure 39:
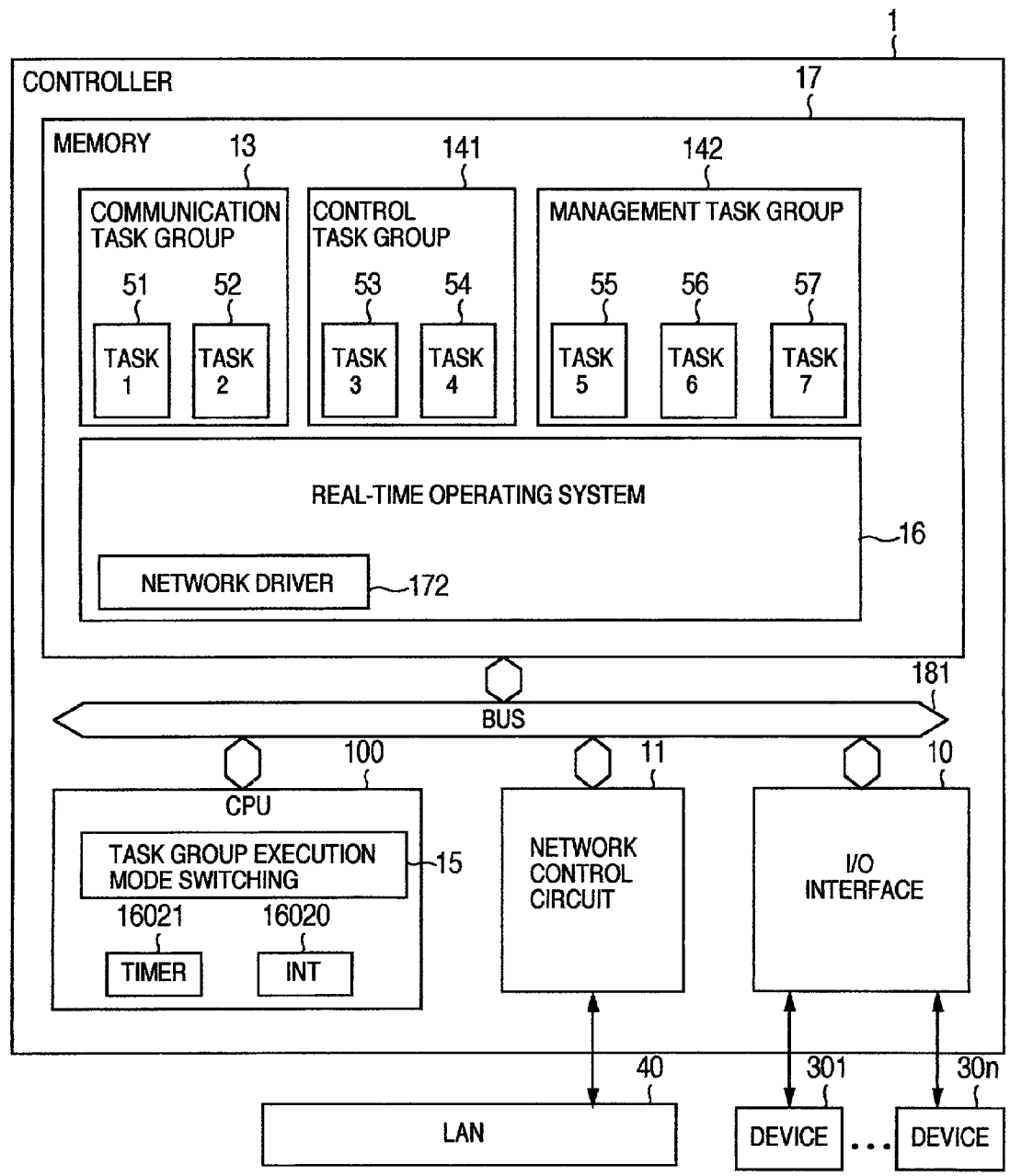
FIG. 39 is a block diagram showing a basic configuration of a controller including a task execution mode switching function achieved by a CPU.

The task execution mode switching 15 of the embodiment was mainly by software. However, as shown in FIG. 39, all or a part of functions of the task execution mode switching 15 can be realized by hardware. FIG. 39 shows an example where a function of the task execution mode switching 15 is realized by hardware on the CPU 100.

(Ninth Embodiment: OS Service for Group Scheduling, Mode Switching, and Pattern Switching)

Figure 40:
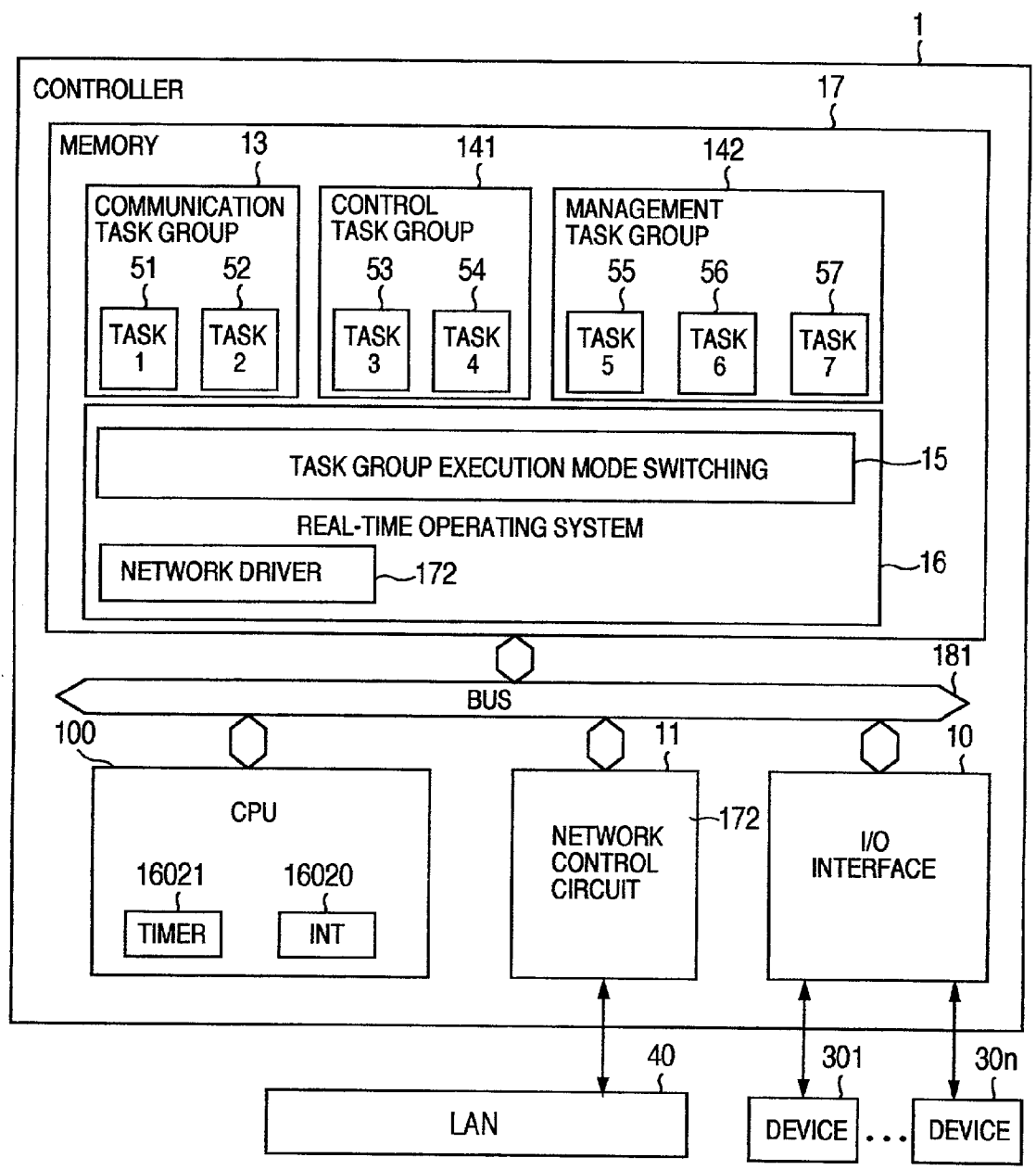
FIG. 40 is a block diagram showing a basic configuration of a controller, where task execution mode switching is carried out by a function of a real-time operating system.

The embodiment has been described, where the task execution control switching 15 carries out the task execution control, such as priority changing of the task groups, suspension/resumption or the like in accordance with the execution mode. Further, as shown in FIG. 40, the task execution mode switching 15 is made a part of the function of the real-time operating system 16 and, accordingly, the above execution control is released to a user as a system call described below. Thus, from an application program prepared by the user, control by the task group execution mode switching 15 that has been described can be easily executed.

Generation and deletion of task group
    Task member registration and deletion in task group
    Priority changing of task group unit
    Suspension/resumption of task group unit
    Setting of duration in execution mode
    Generation and deletion of pattern
    Mode member registration and deletion in pattern Next, description is made of each system call to be provided.

(1) Generation and Deletion of Task Group
    (a) ER ercd=cre_tsk_grp (GID tsk_gid);
    Content: a task group is generated.

Specifically, a structure for managing the task groups 130, 1410 and 1420 of FIG. 6 is formed and secured on the memory.
    Parameter:
    GID tsk_gid ID number of task group to be generated
    Return parameter:
    Erercd Normal end (E_OK) or error code
    (b) ER ercd=del_tsk_grp (GID tsk_gid);
    Content: a task group is deleted.

Specifically, the structure for managing the task groups of FIG. 6 is deleted.
    Parameter:
    GID tsk_gid ID number of task group to be deleted
    Return parameter:
    Erercd Normal end (E_OK) or error code (2) Task Member Registration and Deletion in Task Group
    (a) ER ercd=add_tsk_grp_member (GID tsk_gid, TID tskid);
    Content: a task is registered as a member in a task group.

Specifically, a structure representing a task control table to be registered is connected by a pointer to a tail end of a list constituting the task group of FIG. 6.

Parameter:
GID tsk_gid ID number of target task group
TID tskid ID number of task to be registered
Return parameter:
Erercd Normal end (E_OK) or error code
(b) ER ercd=rm_tsk_grp_member (GID tsk_gid, TID tskid);
Content: a task registered as a member in the group is deleted. Specifically, a structure representing a task control table to be deleted is removed from a list constituting the task groups of FIG. 6.

Parameter:
GID tsk_gid
ID number of target task group
TID tskid
ID number of task to be deleted
Return parameter:
Erercd
Normal end (E_OK) or error code (3) Priority changing of task group unit
(a) ER ercd=tsk_grp_chg_pri (GID tsk_gid, DELTA_PRI delta_tskpri);
Content: priorities of all the tasks registered in the task group are added by delta_tskpri.
Specifically, delta_tskpri is added to priorities of all the tasks on the task control table in the list constituting the task group of FIG. 6.

Parameter:
GID tsk_gid ID number of target task group
DELTA_PRI delta_tskpri priority addition (negative value can be set)
Erercd Normal end (E_OK) or error code (4) Suspension/Resumption of Task Group Unit
(a) ER ercd=tsk_grp_suspend (GID tsk_gid);
Content: execution of all tasks registered in a task group is forcibly suspended. This operation is execution for all the tasks in the list constituting the task group of FIG. 6.

Parameter:
GID tsk_gid ID number of target task group
Return parameter:
ER ercd Normal end (E_OK) or error code
(b) ER ercd=tsk grp resume (GID tsk gid);
Content: execution of all the tasks registered in the task group is resumed. This operation is executed for all the tasks in the list constituting the task group of FIG. 6.

Figure 41:
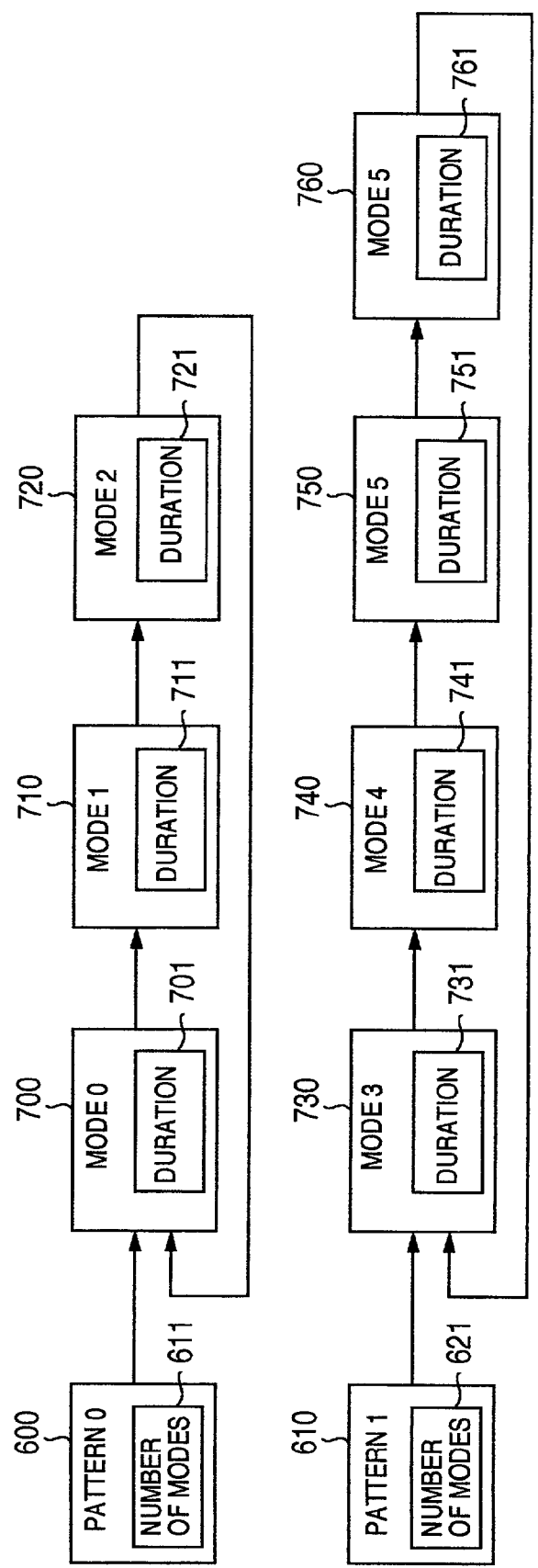
FIG. 41 is a view showing embodiments of a mode and a pattern.

Parameter:
GID tsk_gid ID number of target task group
Return parameter:
ER ercd Normal end (E_OK) or error code (5) Generation, Deletion of Execution Mode
(a) ER ercd=cre_mode (MID mdid);
Content: an execution mode is generated. A specific operation is described by referring to FIG. 41. FIG. 41 shows a structure example of a mode and a pattern of the invention. 700, 710, 720, 730, 740, 750 and 760 represent structures for managing modes; and 701, 711, 721, 731, 741, 751 and 761 durations of the modes. One or more modes are connected to the pattern by a pointer, constructing a list. 601 and 611 represent the numbers of modes registered in the pattern. In the example shown, the number of modes for 601 is 3; and 4 for 611.

For generation of execution modes, structures for managing the modes 700, 710, 720 and the like are generated and secured on the memory.

Parameter:
MID mdid ID number of execution mode to be generated
Return parameter:
ER ercd Normal end (E_OK) or error code
(b) ER ercd=del_mode (MID mdid)
Content: an execution mode is deleted. Specifically, the structure for managing the modes of FIG. 41 is deleted.

Parameter:
MID mdid ID number of execution mode to be deleted
Return parameter:
ER ercd Normal end (E_OK) or error code (6) Setting of Duration in Execution Mode
(a) ER ercd=set_mode_time (MID mdid, TIME tm)
Content: Duration of an execution mode is set. Specifically, a value is set to duration on the structure for managing the mode of FIG. 41.

Parameter:
MID mdid ID number of target execution mode
TIME tm Duration
Return parameter:
ER ercd Normal end (E OK) or error code (6) Pattern generation and deletion
(a) ER ercd=cre_pattern (PID ptnid);
Content: a pattern is generated. Specifically, a structure for managing the pattern 600, 610 or the like of FIG. 41 is formed and secured on the memory.

Parameter:
PID ptnid ID number of pattern to be generated
Return parameter:
ER ercd Normal end (E_OK) or error code
(b) ER ercd=del_pattern (PID ptnid);
Content: a pattern is deleted. Specifically, the structure for managing the task group of FIG. 41 is deleted.

Parameter:
PID ptnid ID number of pattern to be deleted
Return parameter:
ER ercd Normal end (E_OK) or error code (7) Mode Member Registration and Deletion in Pattern
(a) ER ercd=add_pattern_member (PID ptnid, MID mdid);
Content: a mode is registered as a member in a pattern. Specifically, a structure representing a mode to be registered is connected by a pointer to a tail end of a list constituting a pattern of FIG. 41, and the number of modes registered in the pattern is increased by 1.

Parameter:
PID ptnid ID number of target pattern
MID mdid ID number of execution mode to be registered
Return parameter:
ER ercd Normal end (E_OK) or error code
(b) ER ercd=rm_pattern_member (PID ptnid, MID mdid);
Content: a mode registered as a member in the pattern is deleted. Specifically, the structure for managing the mode to be deleted is removed from a list constituting the patters of FIG. 41, and the number of modes registered in the pattern is reduced by 1.

Parameter:
PID ptnid ID number of target pattern
MID mdid ID number of execution mode to be deleted
Return parameter:
ER ercd Normal end (E_OK) or error code (Tenth Embodiment)

Figure 42:
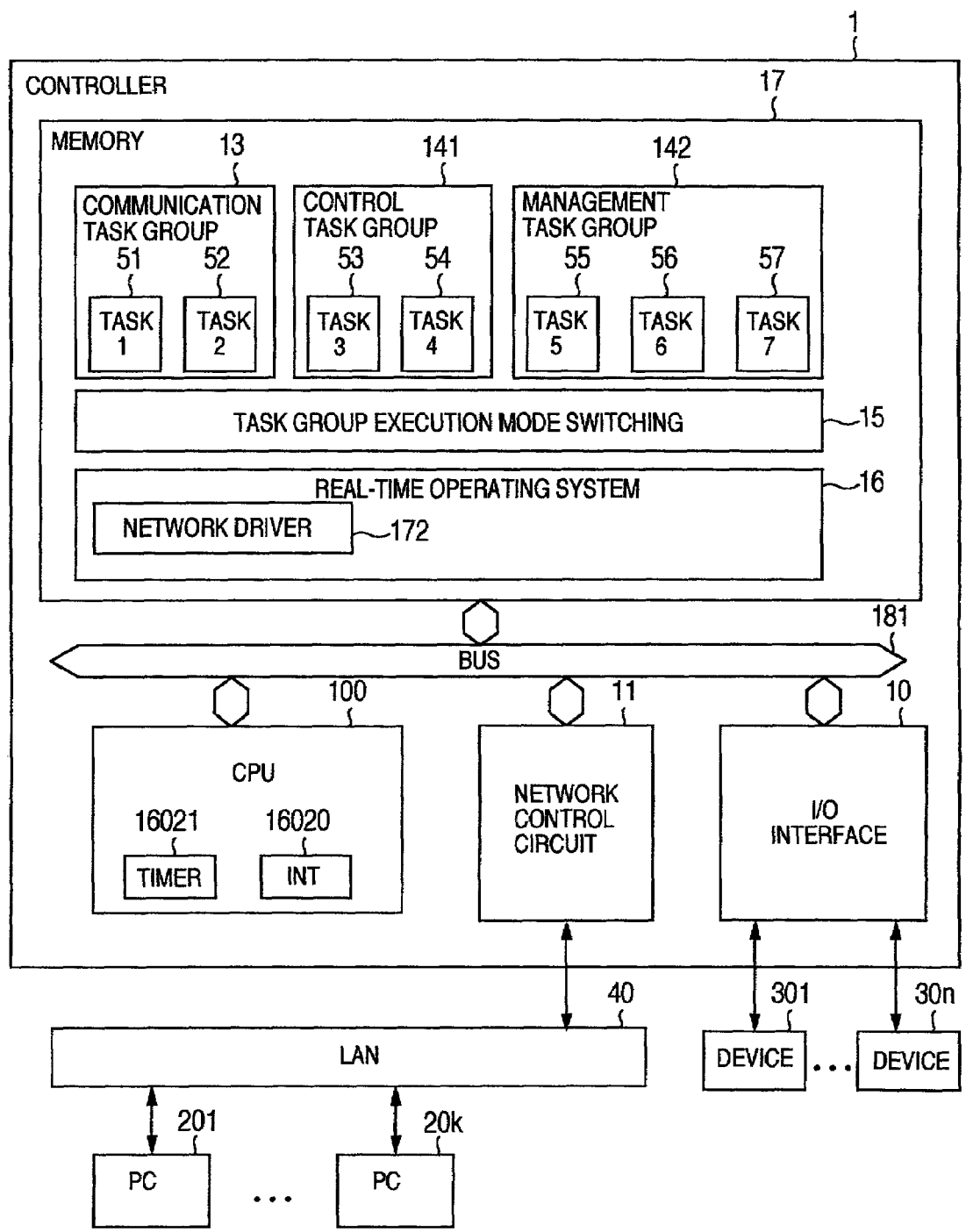
FIG. 42 is a block diagram showing an embodiment of a remote monitorial control system, where the controller of the invention and an information terminal such as a personal computer are connected each other through a network.

FIG. 42 shows a configuration example of a remote monitorial control system using the controller 1 of the invention. Access to the controller 1 is made by personal computers, work stations, various information portable terminals (PDA), portable telephone sets or the like (in the drawing, PC 201 to 20k (k is a positive integer) connected to a LAN 40. Devices 301 to 30n (n is a positive integer) connected to the controller 1 can be monitored, operated and controlled. LAN 40 in FIG. 42 may be not only a local network, but a public network such as public telephone, Internet or the like.

(Eleventh Embodiment)

Figure 43:
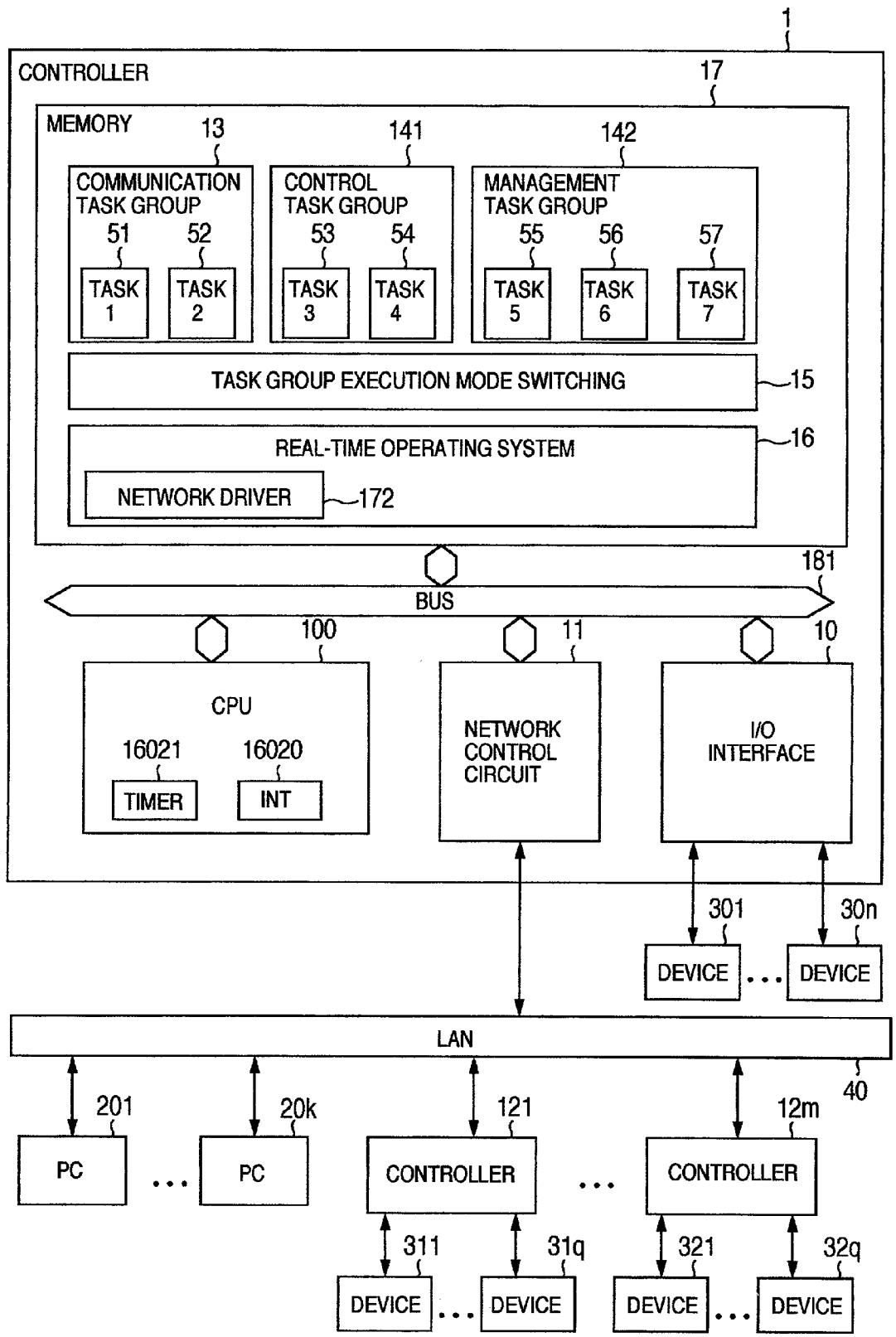
FIG. 43 is a block diagram showing an embodiment of a decentralized control system, where a plurality of controllers of the invention are connected to a network.

FIG. 43 shows an embodiment of a decentralized control system using the controller 1 of the invention. In addition to the controller 1, a plurality of controllers 121 to 12m (m is a positive integer) of the invention are connected. By executing communications among these controllers, gang control, monitoring from a host computer, an operation and control are carried out.

In FIG. 43, as in the case of FIG. 42, work stations, various information portable terminals (PDA), portable telephone sets or the like (in the drawing, PC 201 to 20k (k is a positive integer) are connected to a LAN 40. By accessing these controllers, devices 301 to 30n, 311 to 31p, and 321 to 32q (n, p and q are positive integers) connected to the controller 1 are monitored, operated and controlled from a remote area. In FIG. 43, the LAN 40 may be a local network, a public network such as public telephone, Internet or the like.

It should be further understood by those skilled in the art that the foregoing description has been made on embodiments of the invention and that various changes and modifications may be made in the invention without departing from the spirit of the invention and the scope of the appended claims.

What is claimed is:

1. A controller comprising:
   a memory for storing a plurality of tasks and a program including an operating system for controlling the execution of the tasks;
   an I/O interface for transferring information with a target to be monitorially controlled;
   a network control circuit for transferring information with a network communication system;
   a microprocessor for processing either of the information in accordance with the program stored in the memory; and
   task switching means for managing the plurality of tasks stored in the memory by classifying them into a communication task group for performing network communications and a control task group for monitorially controlling the target, and for switching an execution order of the plurality of tasks by a group unit, wherein:
   said task switching means switches the execution order of the plurality of tasks by the group unit in accordance with priority in response to a switching command,
   said task switching means switches the execution order of the plurality of tasks by the group unit in accordance with an execution mode for giving priority to communications with the network communication system over control of the target, or an execution mode for giving priority to the control of the target over the communications with the network communication system, and
   said task switching means manages operation patterns including the execution mode giving priority to the communications and the execution mode giving priority to the control by classifying them into a plurality of operation patterns, switches the plurality of operation patterns in response to an operation pattern switching command, manages execution time of each execution mode for the switched operation pattern, and instructs switching to the other execution mode after a passage of each execution time.

2. The controller according to claim 1, which further comprises received information monitoring means for monitoring a quantity of received information obtained from communications with the network communication system, said received information monitoring means instructing the task switching means to switch to an operation pattern in accordance with the quantity of received information.

3. A controller comprising:
   a memory for storing a plurality of tasks and a program including an operating system for controlling the execution of the tasks;
   an I/O interface for transferring information with a target to be monitorially controlled;
   a network control circuit for transferring information with a network communication system;
   a microprocessor for processing either of the information in accordance with the program stored in the memory; and
   task switching means for managing the plurality of tasks stored in the memory by classifying them into a communication task group for performing network communications, a control task group for monitorially controlling the target and a management task group for management including the internal monitoring of the microprocessor, and for switching an execution order of the plurality of tasks by a group unit, wherein:
   said task switching means switches the execution order of the plurality of tasks by the group unit in accordance with an execution mode giving priority to communications with the network communication system over control of the target. an execution mode giving priority to the control of the target over the communications with the network communication system, or a mode giving priority to management over each of the execution modes, and
   said task switching means manages operation patterns including the execution mode giving priority to the communications, the execution mode giving priority to the control, and the execution mode giving priority to the management over each of the execution modes by classifying them into a plurality of operation patterns, switches the plurality of operation patterns in response to an operation pattern switching command, manages execution time of each execution mode for the switched operation pattern, and instructs switching to the other execution mode after a passage of each execution time.

* * * * *